United States Patent
Zhang et al.

(10) Patent No.: US 12,273,712 B2
(45) Date of Patent: Apr. 8, 2025

(54) MUTUAL AUTHENTICATION FOR COMMUNICATIONS USING MULTIPLE-INPUT AND MULTIPLE-OUTPUT (MIMO) SIGNALS

(71) Applicant: QUALCOMM Incorporated, San Diego, CA (US)

(72) Inventors: Danlu Zhang, San Diego, CA (US); Yavuz Yapici, Florham Park, NJ (US); Tao Luo, San Diego, CA (US); Junyi Li, Fairless Hills, PA (US); Giridhar Dhati Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/145,006

(22) Filed: Dec. 21, 2022

(65) Prior Publication Data
US 2024/0214804 A1    Jun. 27, 2024

(51) Int. Cl.
*H04B 7/0413*    (2017.01)
*H04W 12/06*    (2021.01)

(52) U.S. Cl.
CPC .......... *H04W 12/06* (2013.01); *H04B 7/0413* (2013.01)

(58) Field of Classification Search
CPC ................ H04W 12/06; H04W 12/062; H04B 7/0413

USPC .......................................................... 726/6
See application file for complete search history.

(56) References Cited

U.S. PATENT DOCUMENTS
2007/0206537 A1    9/2007 Cam-Winget et al.

FOREIGN PATENT DOCUMENTS
CN    106452780 A    2/2017
CN    107592632 A    1/2018

OTHER PUBLICATIONS
International Search Report and Written Opinion—PCT/US2023/082375—ISA/EPO—Feb. 20, 2024.

*Primary Examiner* — Vivek Srivastava
*Assistant Examiner* — Hien V Doan
(74) *Attorney, Agent, or Firm* — Polsinelli

(57) ABSTRACT

Systems and techniques are described herein for mutual authentication in wireless communication. For example, a process may include: transmitting separate authentication requests using separate MIMO channels between network nodes; transmitting an authentication proof from one network node to another; receiving configuration requests based on successful authentication of one network node by the other over the respective MIMO paths; authenticating the configuration requests; and transmitting separate configuration responses via the separate MIMO paths based on the authentication.

44 Claims, 17 Drawing Sheets

MUTUAL AUTHENTICATION FOR COMMUNICATIONS USING MULTIPLE-INPUT AND MULTIPLE-OUTPUT (MIMO) SIGNALS

FIELD

The present disclosure relates generally to communication systems, and more particularly, to mutual authentication between a transmitter and a receiver in a configuration sharing process using multiple-input and multiple-output (MIMO) signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. Among other improvements that may be made, improvements to the security of data as the data is transmitted using the aforementioned technologies may be needed, including security implemented at the physical layer of such data transmission.

SUMMARY

In some examples, systems and techniques are described for mutual authentication in wireless communication. According to some aspects of the present disclosure, the systems and techniques can use two or more MIMO paths while exchanging information that allows the respective devices participating in the wireless communication to mutually authenticate one another.

According to at least one example, a process for mutual authentication in wireless communication is provided. The process includes: transmitting a first authentication request from a first network node to a second network node via a first multiple-input and multiple-output (MIMO) path between the first network node and the second network node, the first authentication request comprising a first phase; transmitting a second authentication request from the first network node to the second network node via a second MIMO path between the first network node and the second network node, the second authentication request comprising a second phase; transmitting an authentication proof from the first network node to the second network node; receiving, at the first network node from the second network node via the first MIMO path, a first configuration request corresponding to a first configuration request credential associated with the second network node, wherein the first configuration request credential is based at least in part on the first phase and an authentication of the authentication proof; receiving, at the first network node from the second network node via the second MIMO path, a second configuration request corresponding to a second configuration request credential associated with the second network node, wherein the second configuration request credential is based at least in part on the second phase and the authentication of the authentication proof; transmitting, based at least in part on authenticating the first configuration request credential, a first configuration response in response to the first configuration request; and transmitting, based at least in part on authenticating the second configuration request credential, a second configuration response in response to the second configuration request.

According to at least one example, a process for mutual authentication in wireless communication is provided. The process includes: receiving, at a second network node from a first network node via a first multiple-input and multiple-output (MIMO) path, a first authentication request comprising a first phase; receiving, at the second network node from the first network node via a second MIMO path, a second authentication request comprising a second phase; receiving an authentication proof at the second network node from the first network node; transmitting, to the first network node from the second network node via the first MIMO path, a first configuration request corresponding to a first configuration request credential associated with the second network node, wherein the first configuration request credential is based at least in part on the first phase and an authentication of the authentication proof; transmitting, to the first network node from the second network node via the second MIMO path, a second configuration request corresponding to a second configuration request credential associated with the second network node, wherein the second configuration request credential is based at least in part on the second phase and the authentication of the authentication proof; receiving, based at least in part on authentication of the first configuration request credential, a first configuration response in response to the first configuration request; and receiving, based at least in part on authentication of the second configuration request credential, a second configuration response in response to the second configuration request.

In another illustrative example, an apparatus for mutual authentication in wireless communication is provided. The apparatus may include at least one memory; and at least one processor coupled to the at least one memory and configured to: transmit a first authentication request from a first network node to a second network node via a first multiple-input and multiple-output (MIMO) path between the first network node and the second network node, the first authentication request comprising a first phase; transmit a second authentication request from the first network node to the second network node via a second MIMO path between the first network node and the second network node, the second authentication request comprising a second phase; transmit an authentication proof from the first network node to the second network node; receive, at the first network node from the second network node via the first MIMO path, a first configuration request corresponding to a first configuration request credential associated with the second network node, wherein the first configuration request credential is based at least in part on the first phase and an authentication of the authentication proof; receive, at the first network node from the second network node via the second MIMO path, a second configuration request corresponding to a second configuration request credential associated with the second network node, wherein the second configuration request credential is based at least in part on the second phase and the authentication of the authentication proof; transmit, based at least in part on authenticating the first configuration request credential, a first configuration response in response to the first configuration request; and transmit, based at least in part on authenticating the second configuration request credential, a second configuration response in response to the second configuration request.

In another illustrative example, an apparatus for mutual authentication in wireless communication is provided. The apparatus may include at least one memory; and at least one processor coupled to the at least one memory and configured to: receive, at a second network node from a first network node via a first multiple-input and multiple-output (MIMO) path, a first authentication request comprising a first phase; receive, at the second network node from the first network node via a second MIMO path, a second authentication request comprising a second phase; receive an authentication proof at the second network node from the first network node; transmit, to the first network node from the second network node via the first MIMO path, a first configuration request corresponding to a first configuration request credential associated with the second network node, wherein the first configuration request credential is based at least in part on the first phase and an authentication of the authentication proof; transmit, to the first network node from the second network node via the second MIMO path, a second configuration request corresponding to a second configuration request credential associated with the second network node, wherein the second configuration request credential is based at least in part on the second phase and the authentication of the authentication proof; receive, based at least in part on authentication of the first configuration request credential, a first configuration response in response to the first configuration request; and receive, based at least in part on authentication of the second configuration request credential, a second configuration response in response to the second configuration request.

In some aspects, one or more of the apparatuses described herein is, is part of, and/or includes a mobile or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a vehicle or a computing device or component of a vehicle, a camera, a personal computer, a laptop computer, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), a system-on-a-chip (SoC), any combination thereof, and/or other type of device. In some aspects, the apparatus(es) include(s) a camera or multiple cameras for capturing one or more images. In some aspects, the apparatus(es) include(s) a display for displaying one or more images, notifications, and/or other displayable data. In some aspects, the apparatus(es) include(s) can include one or more sensors (e.g., one or more RF sensors), such as one or more gyroscopes, one or more gyrometers, one or more accelerometers, any combination thereof, and/or other sensor(s).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

DETAILED DESCRIPTION

Figure 1:
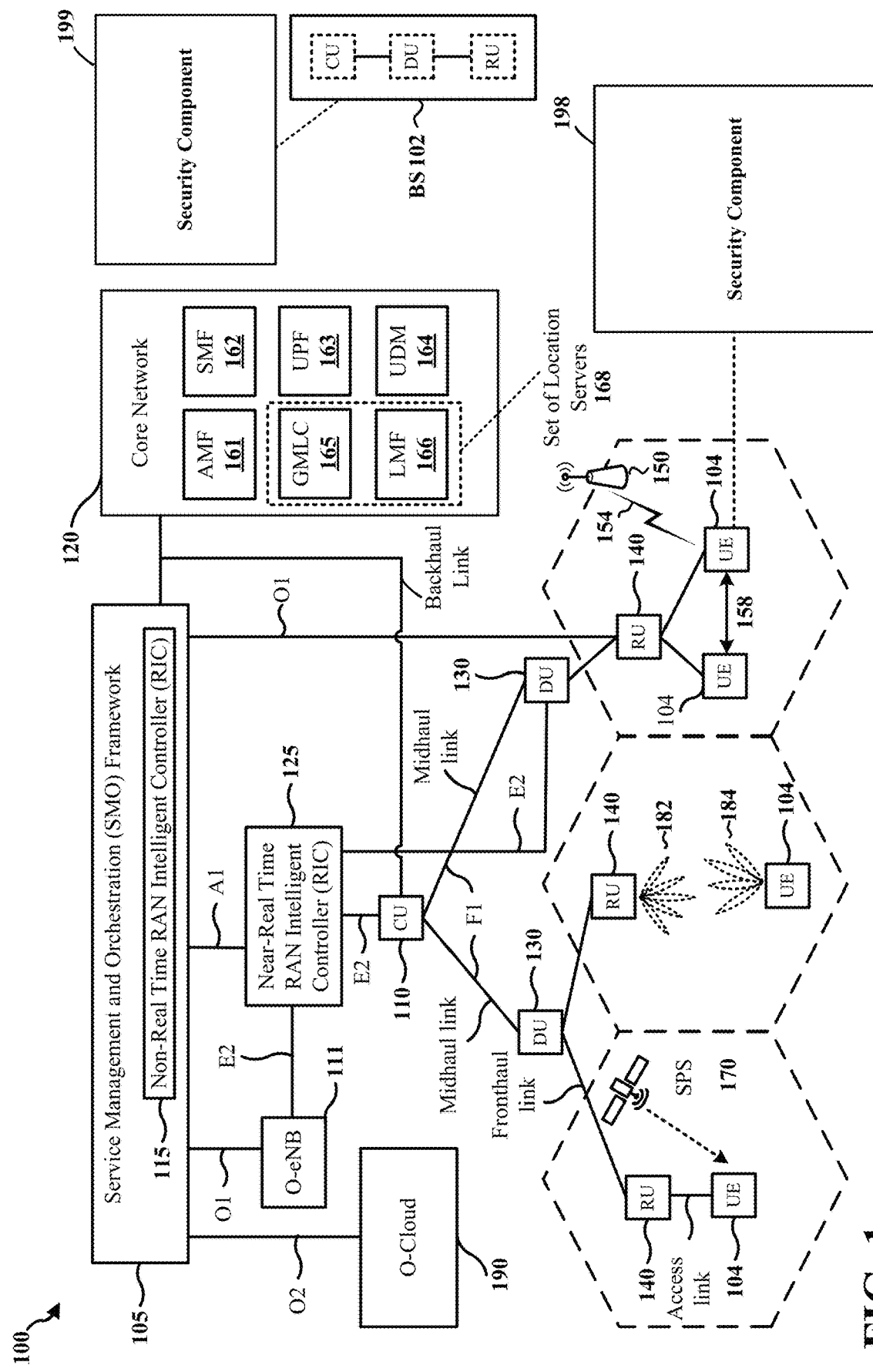
FIG. 1 is a diagram illustrating an example of a wireless communications system and an access network, in accordance with various aspects of the present disclosure.

In some aspects, data confidentiality and integrity in a wireless communication system (e.g., a 5G NR system) may be achieved through upper-layer cryptography. Further, reference signals may be important in many functionalities (e.g., channel estimation, positioning, etc.) in a wireless communication system. Absent security protection for reference signals, transmissions over reference signals may be vulnerable to malicious attacks. Vulnerable reference signals may also impair the reliability of subsequent communication functions. Moreover, in some scenarios, certain aspects of reference signals and/or other parameters may be vulnerable to malicious attacks from entities that exist between a transmitter and receiver (e.g., within the direct path of communication).

In some aspects, a legitimate transmitter may share (transmit) a configuration with legitimate receivers securely and reliably over reference signals in the presence of non-legitimate (e.g., malicious or fake) receivers. On the other hand, in some additional aspects described herein, a legitimate receiver may perform a procedure to identify the presence of non-legitimate (e.g., malicious or fake) transmitters so that the transmission of reference signals may be made secure and reliable.

One or more aspects of the disclosure may relate to physical layer (PHY) authentication techniques for secure and reliable configuration reception over reference signals to prevent a fake transmitter from intervening in a legitimate transmit-receive procedure (e.g., the fake transmitter may intervene in the legitimate transmit-receive procedure in an attempt to steal the credentials of the legitimate receiver and/or manipulate the legitimate receiver with a false configuration during configuration sharing over reference signals).

In particular, in one or more aspects, a first network node may transmit an authentication proof to a second network node. The authentication proof may be based on a first credential (a credential may be any suitable information that may be used to verify the identity of a network node) associated with the first network node. The first network node may be authenticable based on the authentication proof. The second network node may identify whether the first network node is authentic based on the authentication proof. The second network node may transmit a configuration request to the first network node. The configuration request may include a phase-modulated indication of a second credential associated with the second network node. The configuration request may be based on a phase, which may be a random phase or in some cases a pseudo-random phase. The second network node may be authenticable based on the configuration request. The first network node may transmit a configuration response to the second network node. The configuration response may include a phase-modulated confidential parameter. The configuration response may be based on the configuration request. Accordingly, in a configuration sharing process, the transmitter (the first network node) and the receiver (the second network node) may be mutually authenticated. As a result, an adversarial device may not be able to manipulate the receiver by transmitting a fake configuration. Further, the transmitter may not transmit the confidential configuration to a fake receiver.

In some examples, rather than an exchange that includes a single authentication proof, configuration request, and/or configuration response, techniques may be implemented that use multiple-input and multiple-output (MIMO) signals to exchange any number of authentication requests, configuration requests, and/or configuration responses between the network nodes during a mutual authentication process, which may be more resilient to particular attacks wherein an adversarial device along the direct path between the transmitters and receivers is less likely to gain information related to the exchange. Such a MIMO-based mutual authentication technique may use different discrete parameters and/or relative differences between the parameters. In some examples, an eavesdropper along the signal path between the transmitter and receiver, using one or more phase delays between the transmitter and the receiver, may be able to decode certain portions of the information transmitted between the two, such as, for example, a credential for authenticating one of the devices that is commonly known to the pair of devices to facilitate secure communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of communication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUS 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base stations (or any portion therein) and UEs may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices. Other MIMO techniques may be used without departing from the scope of examples described herein.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104, when operating as a second (receiving) network node, may include a security component 198 that may be configured to receive one or more authentication proofs from a first network node. The one or more authentication proofs may be based on a one or more credentials associated with the first network node. The security component 198 may be configured to identify whether the first network node is authentic based on the one or more authentication proofs. The security component 198 may be configured to transmit one or more configuration requests to the first network node. The one or more configuration requests may include a phase-modulated indication of one or more second credentials associated with the second network node. The one or more configuration requests may be based on one or more phases (e.g., one or more random phases). The second network node may be authenticable based on the one or more configuration requests. The security component 198 may be configured to receive one or more configuration responses from the first network node based on the second network node being authenticated. The one or more configuration responses may include one or more phase-modulated confidential parameters. The one or more configuration responses may be based on the one or more configuration requests.

In certain aspects, the base station 102, when operating as a first (transmitting) network node, may include a security component 199 that may be configured to transmit one or more authentication proofs to a second network node. The one or more authentication proofs may be based on one or more credentials associated with the first network node. The first network node may be authenticable based on the one or more authentication proofs. The security component 199 may be configured to receive one or more configuration requests from the second network node. The one or more configuration requests may include a phase-modulated indication of the one or more second credentials associated with the second network node. The one or more configuration requests may be based on a one or more phases (e.g., one or more random phases). The security component 199 may be configured to transmit one or more configuration responses to the second network node. The one or more configuration responses may include one or more phase-modulated confidential parameters. The one or more configuration responses may be based on the one or more configuration requests. Although the following description may be focused on 5G NR, the concepts described herein may be applicable to other similar areas, such as LTE, LTE-A, CDMA, GSM, and other wireless technologies.

Figure 2:
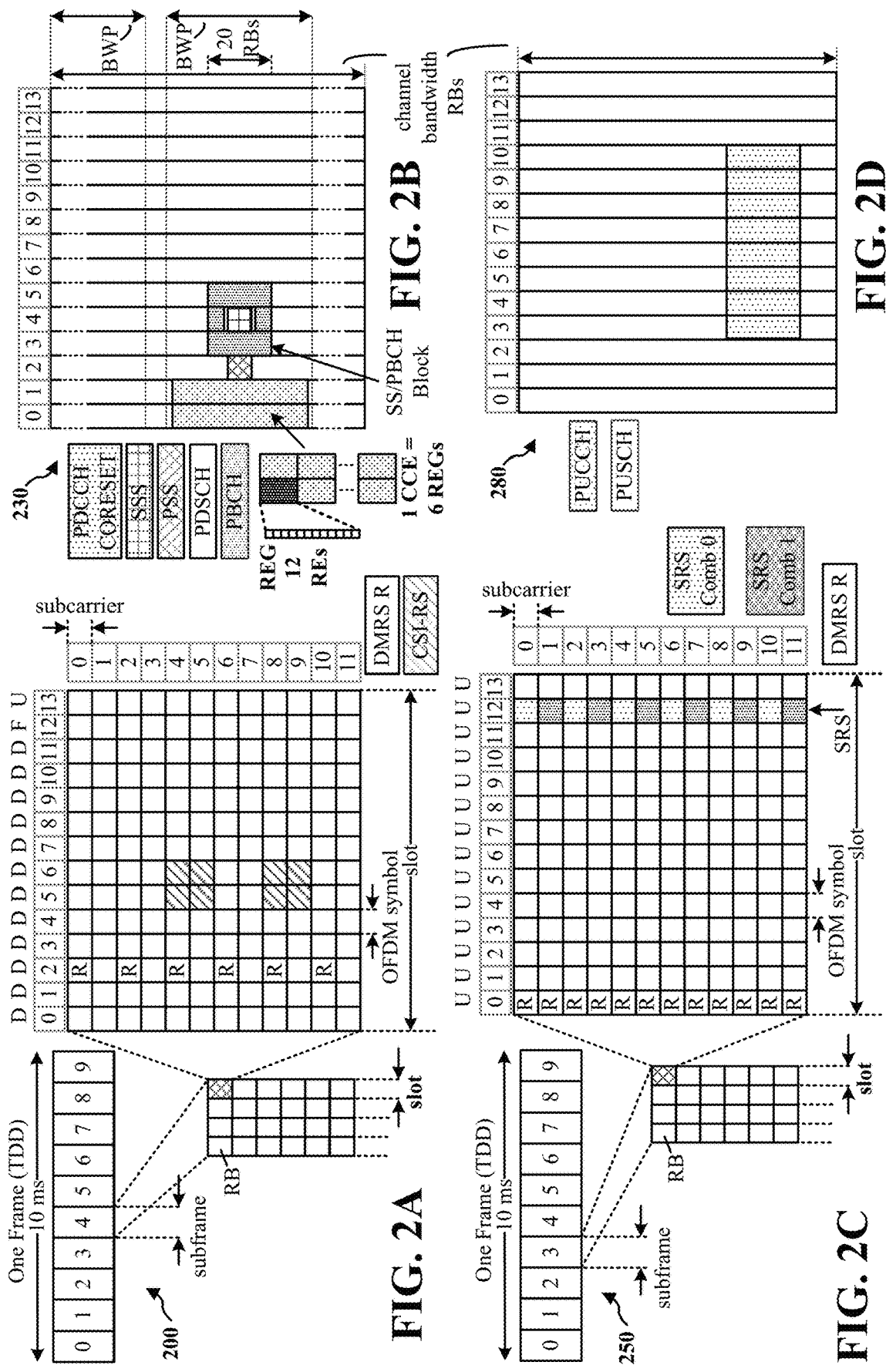
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| $\mu$ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 KHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
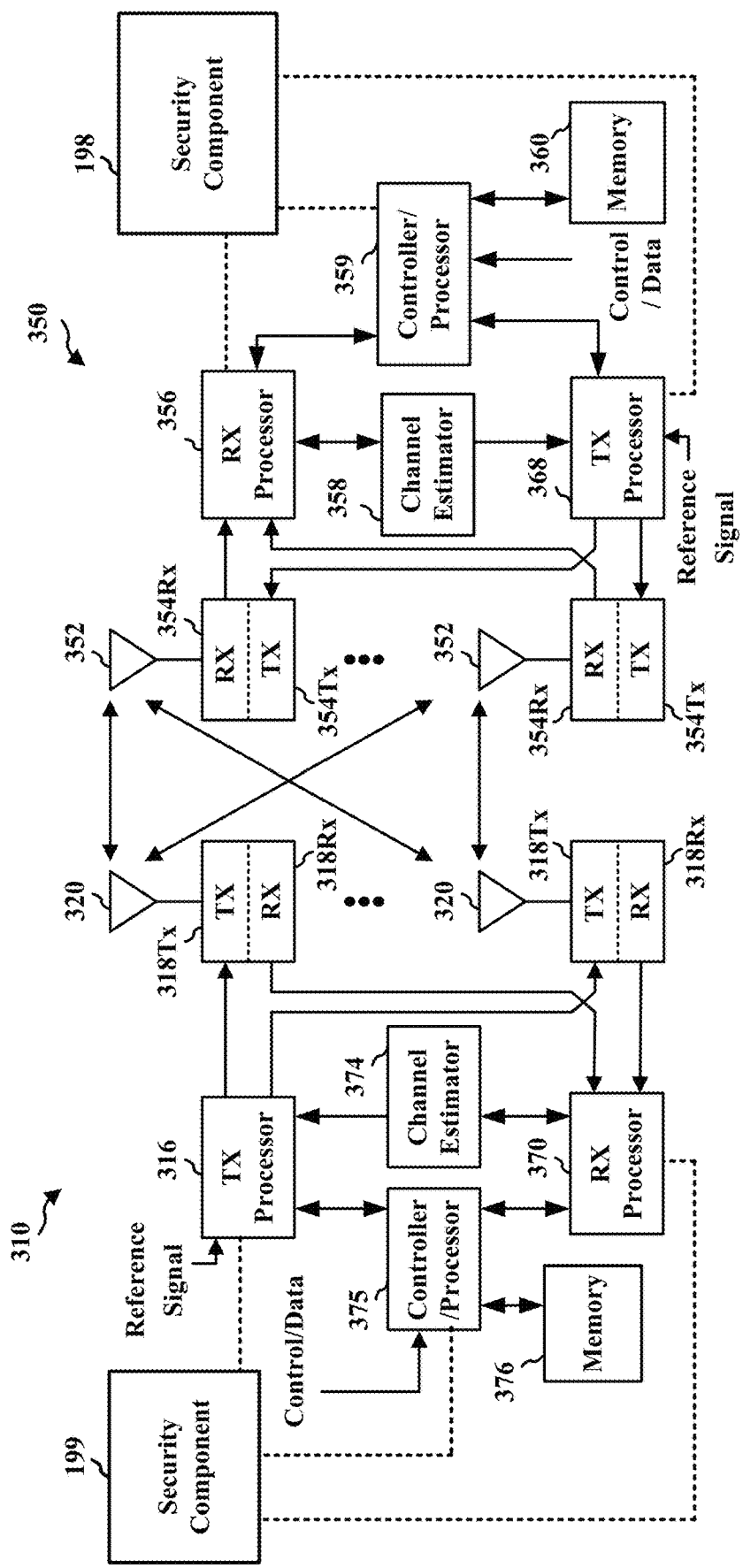
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

In some examples, although not shown in FIG. 3, the TX processor 316, the RX processor 370, the various receivers and transmitters (e.g., 318Tx and 318 RX), and/or the antennas 320 may be configures to implement MIMO communication techniques. As an example, multiple antennas may be used to transmit and/or receive signals, thereby allowing multipath signal propagation techniques.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the security component 198 of FIG. 1.

At least one of the TX processor 316, the RX processor 370, and the controller/processor 375 may be configured to perform aspects in connection with the security component 199 of FIG. 1.

In one or more aspects, transmitter may share the configuration that describes parameters of a PHY technique (e.g., for security, reliability, etc.) with the receiver ahead of time (i.e., before executing the PHY technique in future steps). For example, herein a configuration may refer to a set of parameters including all necessary parameters of a PHY technique that aims at security and/or reliability. For example, if the PHY technique is to add an artificial frequency domain residual sideband (FDRSB) impairment, then the associated configuration may provide the respective parameters, e.g., coefficients of the filter taps to create the in-phase (I)/quadrature (Q) mismatch. Transmitting (sharing) the configuration using reference signals directly in PHY may have the benefit of a short response time due to the fast propagation characteristic in PHY.

Figure 4:
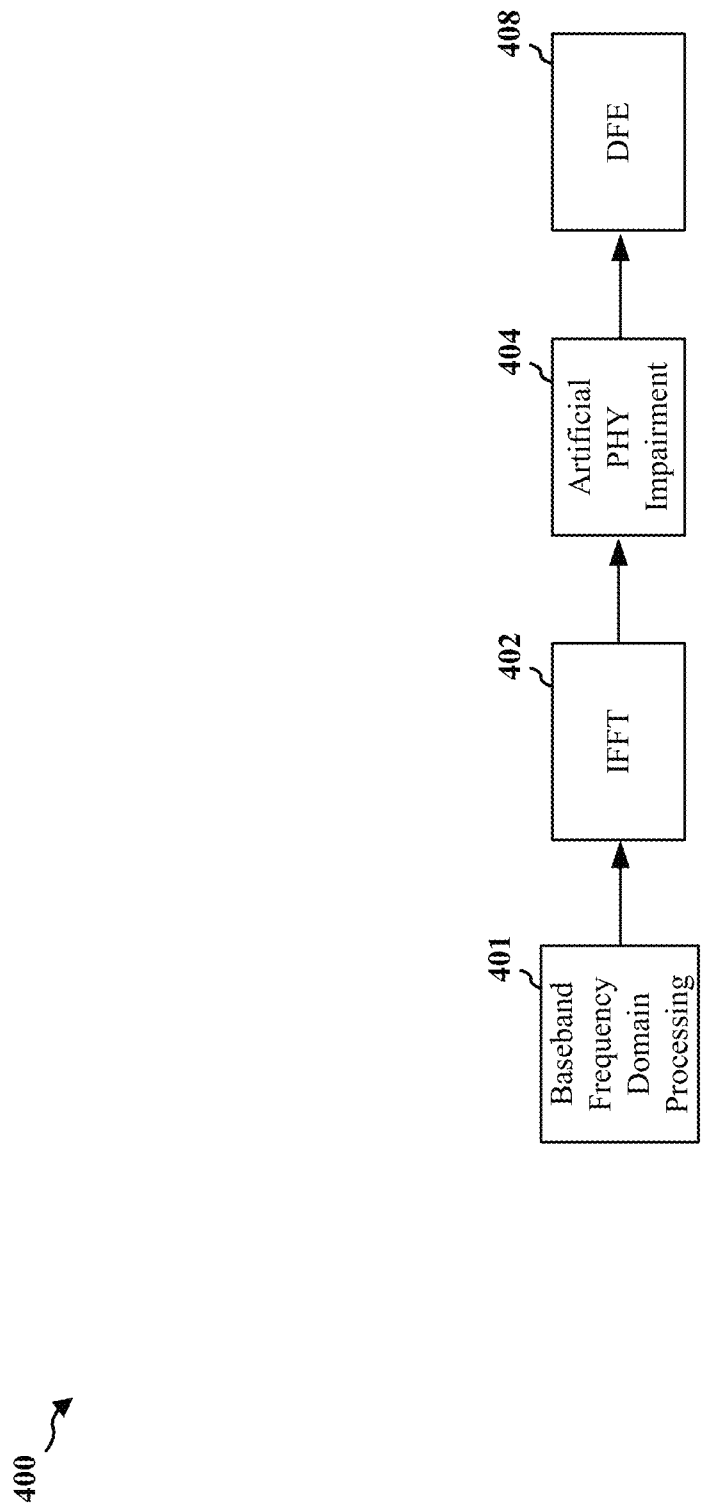
FIG. 4 is an example block diagram illustrating addition of an artificial physical layer (PHY) impairment, in accordance with various aspects of the present disclosure.

FIG. 4 is an example block diagram 400 illustrating addition of an artificial PHY impairment. The artificial PHY impairment (e.g., an amplitude-modulation-to-phase-modulation (AMPM) impairment or an FDRSB impairment) may be a PHY technique as described hereinafter. For example, the artificial PHY impairment may be used as a signature that both authenticates the transmitter and encrypts the transmission. A receiver may receive an indication of the PHY impairment from the transmitter. Based on the indication, the receiver may confirm that a transmission with a PHY impairment consistent with the indication was transmitted by the transmitter. Further, the receiver may recover the content of the transmission by removing the PHY impairment based on the indication. Adding the artificial PHY impairment in the oversampled domain (e.g., the output of the digital front-end (DFE) block 408, also known as the DAC input) may introduce out-of-band leakage, which may lead to a violation of the adjacent channel leakage ratio (ACLR) specification. Accordingly, the artificial PHY impairment may be added in the baseband domain at block 404 between the IFFT block 402 (the IFFT block 402 may receive the output of the baseband frequency domain processing block 401 as the input) and the DFE block 408.

Because the artificial PHY impairment is introduced in the baseband domain, all the impairment may be folded to the in-band, which may be associated with a cost in terms of the error vector magnitude (EVM). Further, the added artificial PHY impairment may be removed at the receiver. However, due to other impairments (e.g., thermal noise, channel noise, etc.) the removal of the artificial PHY impairment at the receiver may not be perfect. In one or more aspects, if the artificial PHY impairment is also added to the at least one data portion of the downlink traffic (e.g., PDSCH and/or PDCCH), a digital post-distortion (DPOD) technique (which may be applied iteratively) may be utilized to improve (e.g., reduce) the EVM associated with the at least one data portion of the downlink traffic.

In one or more aspects, the transmission of the configuration from a legitimate transmitter may be 1) secure directly in PHY (e.g., via phase-difference transmission) such that no adversary capturing the reference signal may be able to learn the configuration, and 2) authentic such that the transmitter may communicate the configuration with just the legitimate receiver.

In one or more further configurations, a legitimate receiver may ensure that the party sharing a configuration is not a fake transmitter (e.g., a fake transmitter may learn/steal the secret credentials of the legitimate receiver and/or manipulate the legitimate receiver with a false/fake configuration to corrupt the reliability of subsequent communication steps.

Therefore, according to one or more aspects described herein, to achieve secure and reliable configuration reception over reference signals, a legitimate receiver may authenticate the transmitter (in addition to the legitimate transmitter authenticating the receiver). In other words, the overall authentication may be mutual, and the legitimate receiver may ensure that its credentials are not captured/stolen by any fake transmitter. Further, the mutual authentication may help the legitimate receiver ensure that it is not manipulated by a fake transmitter with a false configuration.

In one or more aspects, a legitimate receiver may authenticate the transmitter at the beginning of the configuration sharing process (e.g., before a configuration request is sent by the receiver) (e.g., at a first step). The configuration sharing process may refer to the process by which the transmitter may share the configuration associated with the PHY technique to be used with the receiver ahead of the time of the transmission where the PHY technique is actually used. Further, the transmitter may be triggered by the receiver to send the configuration so that the PHY technique may be implemented (e.g., for the receiver to remove an FDRSB impairment, the receiver may need to know the filter taps that the transmitter uses to create the impairment, and the receiver may ask the transmitter to send the configuration associated with the FDRSB impairment). Herein the receiver-provided trigger may be referred to as the configuration request. The legitimate receiver may not continue with sending its own credential (e.g., during a configuration request) if the transmitter fails authentication (i.e., turns out to be a fake transmitter).

Accordingly, the transmitter may send the authentication proof (e.g., a proof that the transmitter may share with the receiver to show that the transmitter is a legitimate transmitter) at the beginning of the configuration sharing process. The authentication proof may include the credentials of the transmitter, where the credentials of the transmitter may be known a priori by the legitimate receiver. In another example, since there may not be a phase difference-based secret sharing step prior to the authentication proof being sent, the credential of the transmitter may be concealed by a uninvertible one-way function (e.g., a hash function) before being sent by the transmitter, in order to prevent the credential of the transmitter from being captured in case of exposure. By using the hashed version of the credential of the transmitter, the credential may not be learned even if the hashed version of the credential is captured by an unintended receiver/intruder due to the use of the uninvertible one-way function. The hashed version of the credential may serve as a proof of the identity of the transmitter for the legitimate receiver as the legitimate receiver may generate, by itself, the hashed version of the credential of the transmitter and may compare the generated version with the received version.

Authenticating the transmitter at the beginning of the configuration sharing process may prevent a fake transmitter from learning the credentials of a legitimate receiver or manipulating the legitimate receiver with a fake configuration. However, the technique may be associated with the cost of 1) higher computational complexity due to the uninvertible one-way function computation directly in PHY, and 2) incorporating pilots to detect the transmitted tag coherently.

In one or more additional configurations, the legitimate receiver may authenticate the transmitter at the end of the configuration sharing process (e.g., after the configuration request/response has been communicated) (e.g., at a last step). The legitimate receiver may discard a configuration if the transmitter of the configuration is not authenticated at the end of the configuration sharing process. Accordingly, manipulation of the legitimate receiver via a fake configuration may be prevented.

Accordingly, the transmitter may send the credentials of the transmitter at the end of the configuration sharing process (e.g., while sharing the configuration). In particular, the transmitter may send the credentials of the transmitter through the phase difference-based secret sharing technique (e.g., using the channel phase response from the previous step). Compared to authenticating the transmitter at the beginning of the configuration sharing process, authenticating the transmitter at the end of the configuration sharing process may be associated with the advantage of much lower computational cost.

Because the transmitter is authenticated at the end of the configuration sharing process, the technique may not prevent a fake transmitter from learning the credentials of a legitimate receiver because the receiver may send its credentials before authenticating the transmitter. Therefore, the legitimate receiver may revoke its own credentials for the purpose of further use if the transmitter cannot be authenticated.

Figure 5:
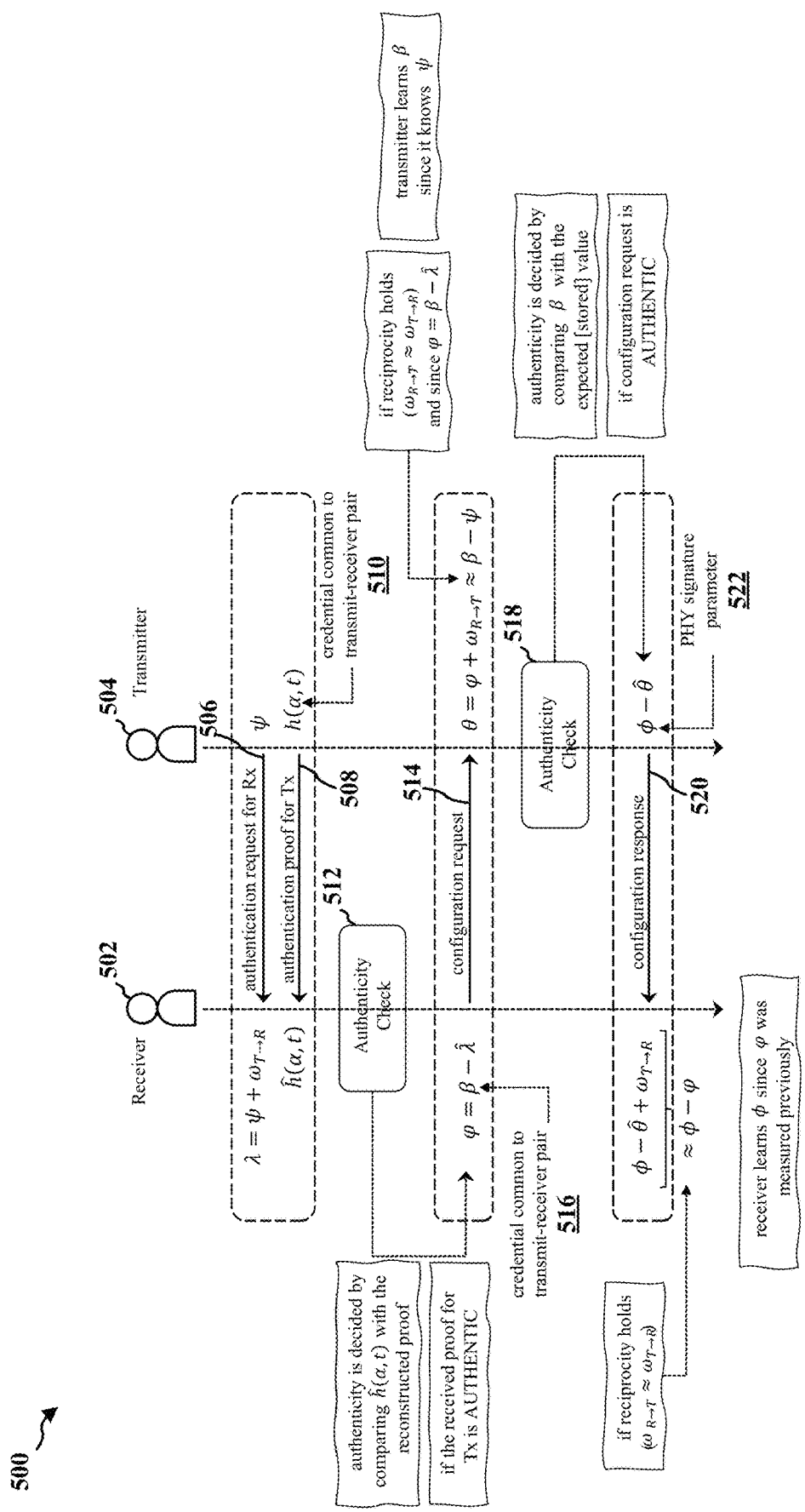
FIG. 5 is a diagram illustrating an example process for secure and reliable configuration sharing according to one or more aspects.

FIG. 5 is a diagram illustrating an example process 500 for secure and reliable configuration sharing according to one or more aspects. The legitimate receiver 502 and the legitimate transmitter 504 may be referred to simply as the receiver 502 and the transmitter 504. Although in some aspects herein the receiver 502 may correspond to a UE (e.g., a UE 104) and the transmitter 504 may correspond to a base station (e.g., a base station 102), the disclosure is not so limited. In different configurations, the receiver 502 and the transmitter 504 may correspond to network nodes of any suitable types, as appropriate.

As shown, at 506, the transmitter 504 may send an authentication request to the receiver 502. The authentication request 506 may include a random phase $\psi$ (e.g., an arbitrary phase between 0 and 360 degrees). In some aspects, the phase $\psi$ may be known to the transmitter 504 but not to the receiver 502. In one or more aspects, a new phase value $\psi$ may be selected by the transmitter 504 each time a new authentication request is sent at 506 (e.g., to prevent the replay attack, that is, to prevent an adversarial device from recording the authentication response to deceive the receiver 502 later on). Further, in one or more aspects, the transmitter 504 may use a different beam each time the transmitter 504 sends a new authentication request at 506. In particular, the transmitter 504 may choose the beam randomly (e.g., also to prevent the replay attack).

At 508, the transmitter 504 may send an authentication tag (also referred to as the authentication proof of the transmitter 504) $h(\alpha, t)$ to the receiver 502, where $\alpha$ 510 may be the credentials of the transmitter 504 and t may be a time index (e.g., a sequence number—to prevent replay attacks). In particular, $\alpha$ 510 may be known (a priori) by the receiver 502.

In one or more aspects, the authentication tag/proof 508 may be generated using an uninvertible one-way function (e.g., a hash function) $h(\cdot)$ to conceal the content lest the authentication tag/proof 508 be captured by an adversarial device. Because $h(\cdot)$ is an uninvertible one-way function, an adversarial device may not learn the content (i.e., the input to $h(\cdot)$) of $h(\cdot)$ even if the authentication tag/proof 508 is captured by an adversarial device.

The receiver 502 may obtain the estimate of the received authentication tag as $\hat{h}(\alpha, t)$, which may be performed in a coherent fashion by employing additional pilot resources used to estimate the channel first (the fashion in which the received authentication tag is estimated may be referred to as coherent because the channel estimate is utilized). Then, to perform the authenticity check 512 to authenticate the transmitter 504, the receiver 502 may compare the estimate $\hat{h}(\alpha, t)$ against a reconstructed version of $h(\alpha, t)$ (as $\alpha$ 510 is available to the receiver 502 and t is tracked by the receiver 502, the receiver 502 may reconstruct a version of $h(\alpha, t)$ on its own). In one or more aspects, to decide, at 512, on the legitimacy of the transmitter 504, the comparison may be based on a distribution-based hypothesis test and/or a Hamming-distance-based similarity test. Thereafter, the receiver 502 may continue with sending its own credentials if the transmitter 504 is confirmed as legitimate based on the authenticity check 512. Otherwise, if the transmitter cannot be authenticated, the receiver 502 may stop participating in the configuration sharing process.

In one or more aspects, the random phase $\psi$ and the authentication tag $h(\alpha, t)$ may be transmitted simultaneously by the transmitter 504 on different subcarriers. In additional configurations, the random phase $\psi$ and the authentication tag $h(\alpha, t)$ may be transmitted using adjacent time-frequency resources so that the receiver 502 may correlate the two transmissions at 505 and 508 assume both are coming from the same source (i.e., the transmitter 504).

As a response to sending $\psi$ by the transmitter 504 at 506, the phase output of the channel at the receiver 502 may become $\lambda=\psi+\omega_{T \to R}$, where $\omega_{T \to R}$ may be the phase rotation due to the RF front-end and (propagation over) the channel. The receiver 502 may measure $\lambda$ as $\hat{\lambda}$. Accordingly, the receiver 502 may prepare the authentication response including the phase value $\varphi=\beta-\hat{\lambda}$, where $\beta$ 516 may be the phase-modulated credential of the receiver 502 known also by the transmitter 504. The phase $\beta$ 516 representing the credential of the receiver 502 may be independent from the credential $\alpha$ 510. At 514, the receiver 502 may send the phase value $\varphi$ back to the transmitter 504.

Even if an adversarial device is able to measure the transmitted phase $\varphi=\beta-\hat{\lambda}$, the adversarial device may not learn the phase $\beta$ 516 representing the credential of the receiver 502 because the adversarial device may not know $\hat{\lambda}$ ($\hat{\lambda}$ is the value measured at the receiver 502 but not at other devices). Therefore, the authentication response included in the configuration request 514 may be PHY-secure.

The respective phase for the configuration request 514 at the transmitter 504 may be $\theta=\varphi+\omega_{R \to T}$, which may be equivalent to $\beta-\psi$ due to channel reciprocity between the authentication request 506 and the authentication response/configuration request 514 (i.e., $\omega_{R \to T} \approx \omega_{T \to R}$) and the fact that $\varphi=\beta-\hat{\lambda}$.

The transmitter 504 may measure the received phase as $\hat{\theta} \approx \beta - \psi$. Because the initial random phase $\psi$ is known to the transmitter 504, the transmitter 504 may readily obtain the phase $\beta$ 516 representing the credential of the receiver 502 from the authentication response/configuration request 514. Further, because $\beta$ 516 is known a priori to the transmitter 504, the transmitter 504 may perform the authenticity check 518 by comparing the $\beta$ obtained from the phase output against the known/expected $\beta$. In particular, the authenticity check 518 may be based on an authentication test (e.g., a distribution-based hypothesis test, a Hamming distance-based similarity test, etc.) to determine whether the received credential $\beta$ matches the known/expected credential $\beta$. If the received phase $\beta$ 516 passes the authentication test, the receiver 502 may be authenticated to the transmitter 504. Accordingly, the transmitter 504 may then start the procedure to transmit the configuration. Otherwise, if the receiver is not authenticated, the transmitter 504 may stop participating in the process.

If the authentication (i.e., the authenticity check at 518) completes successfully, at 520, the transmitter 504 may send the confidential configuration to the authenticated receiver 502 in a PHY-secure fashion (e.g., using a phase difference-based technique). Therefore, the transmitter 504 may treat the authentication response at 514 as the configuration request, and may prepare the configuration response 520 to include the configuration represented by a phase-modulated parameter $\phi$. The configuration response 520 may be transmitted by the transmitter 504 in response to a configuration request, and may include the requested configuration. The transmitter 504 may then construct the configuration response 520 based on the phase value $\phi - \hat{\theta}$, where $\hat{\theta}$ 522 may be the phase estimate of the channel output for the configuration request. Even if the phase $\phi - \hat{\theta}$ is measured by an adversarial device, the adversarial device may not learn the phase $\phi$ 522 because the adversarial device may not know $\hat{\theta}$. As a result, the adversarial device may not learn the confidential configuration data represented by the phase $\phi$ 522. Therefore, the configuration response 520 may be PHY-secure.

The respective phase for the configuration response 520 at the receiver 502 may then become $\phi - \hat{\theta} + \omega_{T \to R}$, which similarly may be equivalent to $\phi - \varphi$ due to channel reciprocity (i.e., $\omega_{R \to T} \approx \omega_{T \to R}$) and the fact that $\theta = \varphi + \omega_{R \to T}$.

The estimate of the residual phase $\phi - \varphi$ may then be exploited by the receiver 502 to learn the configuration via the related parameter $\phi$ (e.g., $\phi$ 522) because $\varphi$ is already known to the receiver 502 (the receiver may construct $\varphi = \beta - \hat{\lambda}$ while forming authentication response/configuration request 514).

In one or more aspects, the phase parameters $\beta$ and $\phi$ (e.g., $\beta$ 516 and $\phi$ 522) each may be likely to be multiple bits long. Accordingly, multiple tones may be used in the frequency domain to transmit each of the phase parameters $\beta$ and $\phi$ (e.g., $\beta$ 516 and $\phi$ 522) during the transmissions of the configuration request 514 and the configuration response 520, respectively.

In one example, the random phase $\psi$ and authentication tag/proof $h(\alpha, t)$ may be transmitted by the transmitter 504 simultaneously (e.g., on different subcarriers of an OFDM symbol). In one or more aspects, the receiver 502 may assume that the OFDM symbol carrying a valid $h(\alpha, t)$ is coming from a legitimate transmitter, and therefore may use the phase measured at subcarriers (of the same OFDM symbol) corresponding to $\psi$ when constructing configuration request 514.

In a different example, the phase up and authentication tag/proof $h(\alpha, t)$ may be transmitted by the transmitter 504 in adjacent time or frequency. Accordingly, the receiver 502 may correlate (tie) the two transmissions (e.g., based on the locations of the time-frequency resources) to make sure that both are coming from the same transmitter. Therefore, in one configuration, the transmitter 504 may produce the authentication tag/proof as $h(\alpha, t, \psi)$ (i.e., the authentication tag/proof may be based on $\psi$ as well). Further, the receiver 502 may obtain or estimate v. Accordingly, the receiver 502 may produce the authentication response/configuration request 514 corresponding to $\psi$ if the authentication tag/proof $h(\alpha, t, \psi)$ transmitted by the transmitter 504 in another time-frequency resource (e.g., an adjacent resource) is valid (i.e., if the transmitter 504 is authenticated). Therefore, the time-frequency resources used to transmit $\psi$ at 506 and $h(\alpha, t, \psi)$ at 508 may be correlated (tied). Therefore, the transmitter 504 may allocate additional subcarriers (along with the subcarriers carrying $\psi$) to send pilot symbols to help the receiver 502 estimate first the channel and then $\psi$. Based on the estimated $\psi$, the receiver 502 may then locally generate a version of the authentication proof $h(\alpha, t, \psi)$, and may perform the authentication test at 512. The receiver 502 may generate the authentication response/configuration request 514 using the phase response associated with $\psi$ if authentication at 512 is valid (i.e., if the transmitter 504 is authenticated).

In one or more aspects, because the randomness of the authentication proof $h(\alpha, t, \psi)$ may be well provided by $\psi$, the time dependency may be dropped without exposing the receiver 502 to a replay attack. In other words, at 508, $h(\alpha, \psi)$ may be used without exposing the receiver 502 to replay attacks.

Figure 6:
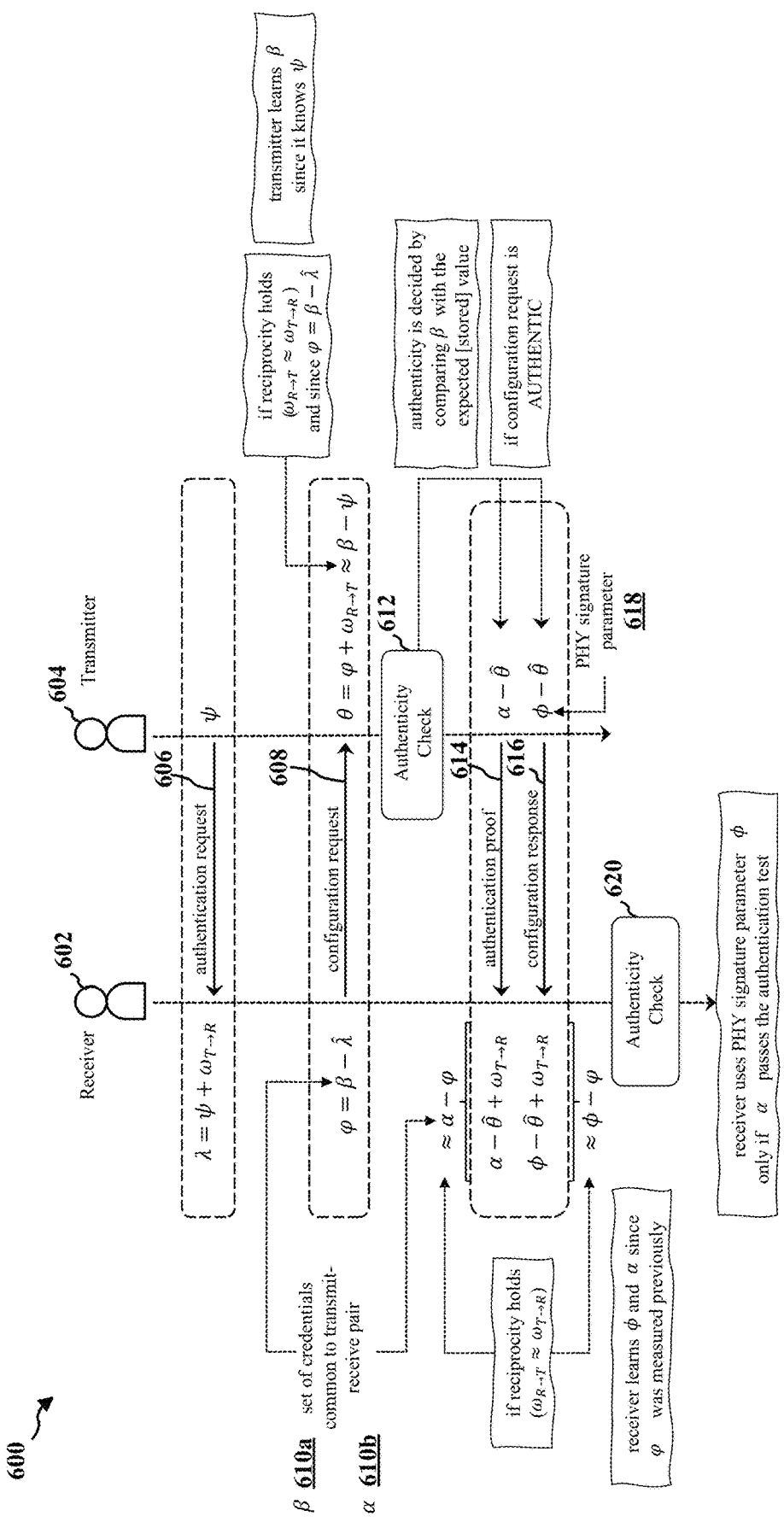
FIG. 6 is a diagram illustrating an example process for secure and reliable configuration sharing according to one or more aspects.

FIG. 6 is a diagram illustrating an example process 600 for secure and reliable configuration sharing according to one or more aspects. The legitimate receiver 602 and the legitimate transmitter 604 may be referred to simply as the receiver 602 and the transmitter 604. Although in some aspects herein the receiver 602 may correspond to a UE (e.g., a UE 104) and the transmitter 604 may correspond to a base station (e.g., a base station 102), the disclosure is not so limited. In different configurations, the receiver 602 and the transmitter 604 may correspond to network nodes of any suitable types, as appropriate.

At 606, the transmitter 504 may send an authentication request to the receiver 602. The authentication request 606 may include a random phase $\psi$. In one or more aspects, the phase $\psi$ may be known to the transmitter 604 but not to other devices. In one or more aspects, a new phase value $\psi$ may be selected by the transmitter 604 each time a new authentication request is sent at 606 (e.g., to prevent the replay attack, that is, to prevent an adversarial device from recording the authentication response to deceive the receiver 602 later on). Further, in one or more aspects, the transmitter 604 may use a different beam each time the transmitter 604 sends a new authentication request at 606. In particular, the transmitter 604 may choose the beam randomly (e.g., also to prevent the replay attack).

As a response to sending $\psi$ by the transmitter 604, the phase output of the channel at the receiver 602 may become $\lambda = \psi + \omega_{T \to R}$, where $\omega_{T \to R}$ may be the phase rotation due to the RF front-end and (propagation over) the channel, The receiver 602 may measure $\lambda$ as $\hat{\lambda}$.

Accordingly, the receiver 602 may prepare the authentication response including the phase value $\varphi = \beta - \hat{\lambda}$, where $\beta$ 610a may be the phase-modulated credential of the receiver 602 known also by the transmitter 604. The phase $\beta$ 610a representing the credential of the receiver 602 may be independent from the credential α 610b. At 608, the receiver 602 may send the phase value φ back to the transmitter 604.

Even if an adversarial device is able to measure the transmitted phase $\varphi=\beta-\hat{\lambda}$, the adversarial device may not learn the phase β 610a representing the credential of the receiver 602 because the adversarial device may not know $\hat{\lambda}$ ($\hat{\lambda}$ is the value measured at the receiver 602 but not at other devices). Therefore, the authentication response included in the configuration request 608 may be PHY-secure.

The respective phase for the configuration request 608 at the transmitter 604 may be $\theta=\varphi+\omega_{R\rightarrow T}$, which may be equivalent to β–ψ due to channel reciprocity between the authentication request 606 and the configuration request 608 (i.e., $\omega_{R\rightarrow T}\approx\omega_{T\rightarrow R}$) and the fact that $\varphi=\beta-\hat{\lambda}$.

The transmitter 604 may measure the received phase as $\hat{\theta}\approx\beta-\psi$. Because the initial random phase ψ is known to the transmitter 604, the transmitter 604 may readily obtain the phase β 610a representing the credential of the receiver 602 from the configuration request 608. Further, because β 610a is known a priori to the transmitter 604, the transmitter 604 may perform the authenticity check 612 by comparing the β obtained from the phase output against the known/expected β. In particular, the authenticity check 612 may be based on an authentication test (e.g., a distribution-based hypothesis test, a Hamming distance-based similarity test, etc.) to determine whether the received credential β matches the known/expected credential β. If the received phase β 610a passes the authentication test, the receiver 602 may be authenticated to the transmitter 604. Accordingly, the transmitter 604 may then start the procedure to transmit the configuration. Otherwise, if the receiver is not authenticated, the transmitter 604 may stop participating in the process.

If the authentication (i.e., the authenticity check at 612) completes successfully, the transmitter 604 may send the authentication proof 614 and the configuration response 616 including the confidential configuration to the authenticated receiver 602 both in a PHY-secure fashion (e.g., using a phase difference-based technique).

The authentication proof 614 may include credentials of the transmitter 604. In particular, the credential of the transmitter 604 may be represented by the phase-modulated credential α 610b in the authentication proof 614. Further, the configuration response 616 may include the configuration represented by a phase-modulated parameter φ 618.

The transmitter 604 may construct the authentication proof 614 and the configuration response 616 based on phase values $\alpha-\hat{\theta}$ and $\phi-\hat{\theta}$, respectively, where may be the phase estimate of the channel output associated with the configuration request 608. Even if either of $\alpha-\hat{\theta}$ or $\phi-\hat{\theta}$ is measured by an adversarial device, the adversarial device may not be able to learn the concealed phases α or φ (e.g., α 610b or φ 618) because the adversarial device may not know $\hat{\theta}$. Therefore, the authentication proof 614 and the configuration response 616 may be communicated in a PHY-secure fashion.

The respective phase outputs for the authentication proof 614 and the configuration response 616 at the receiver 602 may become $\alpha-\hat{\theta}+\omega_{T\rightarrow R}$ and $\phi-\hat{\theta}+\omega_{T\rightarrow R}$, respectively, which may be equivalent to α–φ and φ–φ, respectively, due to channel reciprocity (i.e., $\omega_{R\rightarrow T}\approx\omega_{T\rightarrow R}$) and the fact that $\theta=\varphi+\omega_{R\rightarrow T}$. Because φ is already available to the receiver 602 (the receiver 602 may construct $\varphi=\beta-\hat{\lambda}$ when forming the configuration request 608), noisy estimates of both α 610b and φ 618 may become available to the receiver 602. Further, because α 610b is known a priori to the receiver 602, the receiver 602 may perform the authenticity check 620 by comparing the α obtained from the phase output against the known/expected α. In particular, the authenticity check 620 may be based on an authentication test (e.g., a distribution-based hypothesis test, a Hamming distance-based similarity test, etc.) to determine whether the received credential α matches the known/expected credential α. If the received credential α 610b passes the authentication test at 620, the receiver 602 may then conclude the legitimacy of the transmitter 604, and may continue with learning/using the configuration (e.g., the parameter represented by φ 618). Otherwise, if the transmitter is not authenticated, the receiver 602 may discard the received configuration.

In one or more aspects, the phase parameters α, β, and φ (e.g., α 610b, β 610a and φ 618) each may be likely to be multiple bits long. Accordingly, multiple tones may be used in the frequency domain to transmit each of the phase parameters α, β, and φ (e.g., α 610b, β 610a and φ 618) during the transmissions of the authentication proof 614, the configuration request 608, and the configuration response 616, respectively.

In some aspects, the transmitter 504/604 may include (e.g., append) a cyclic redundancy check (CRC) in the phase parameter φ (e.g., φ 522/618) (e.g., using frequency domain resource blocks) to enable the receiver 502/602 to verify the accuracy of the received phase φ 522/618 and hence the configuration. If the receiver 502/602 identifies a received phase φ 522/618 as inaccurate based on the CRC, the receiver 502/602 may transmit a negative acknowledgement (NACK) to the transmitter 504/604. Accordingly, in some aspects, if the transmitter 504/604 does not receive a NACK (e.g., within a time window after a transmission), the transmitter 504/604 may assume that the receiver 502/602 has learned the configuration correctly.

If the transmitter 504/604 receives a NACK, in one configuration, the transmitter 504/604 may try resharing the configuration following the same procedure as described above. In another configuration, if the transmitter 504/604 receives a NACK, the transmitter 504/604 may suspend the configuration sharing process for a preconfigured time period. In some aspects, if the suspension time period is longer than a network-selected authentication lifetime or the channel coherence time, the authentication procedure may also be repeated prior to the resumption of configuration transmission.

Due to imperfections in channel reciprocity and phase estimation, the measured β–ω, α–φ, and φ–φ may be inaccurate/erroneous (i.e., deviate from correct values). Accordingly, to reduce negative effects of the deviation, in some aspects, the transmit-receive pair (e.g., the transmitter 504/604-receiver 502/602 pair) may (periodically or from time to time) exchange known phase parameters β, α, and φ to measure and quantify the errors between the received and the expected/correct values of β–ψ, α–φ, and φ–φ (ψ and φ are used because ψ and φ are available to respective related devices/parties).

In some aspects, the network may (dynamically or statically) set thresholds for the errors associated with β–ψ, α–φ, and φ–φ, as described above, based on whether the transmitted data is known or not known to the receiver 502/602. In some aspects, different thresholds may be set for the errors associated with β–ψ, α–φ, and φ–φ. In some aspects, if the error measurements for β–ψ, α–φ, and φ–φ are all below their respective thresholds, the phase difference-based configuration sharing process as illustrated in FIGS. 5 and 6 may be allowed. On the other hand, if at least one of the error measurements for β–ψ, α–φ, and φ–φ is below its respective threshold, the phase difference-based configuration sharing process may be suspended until at least the phase errors are measured the next time.

Figure 7:
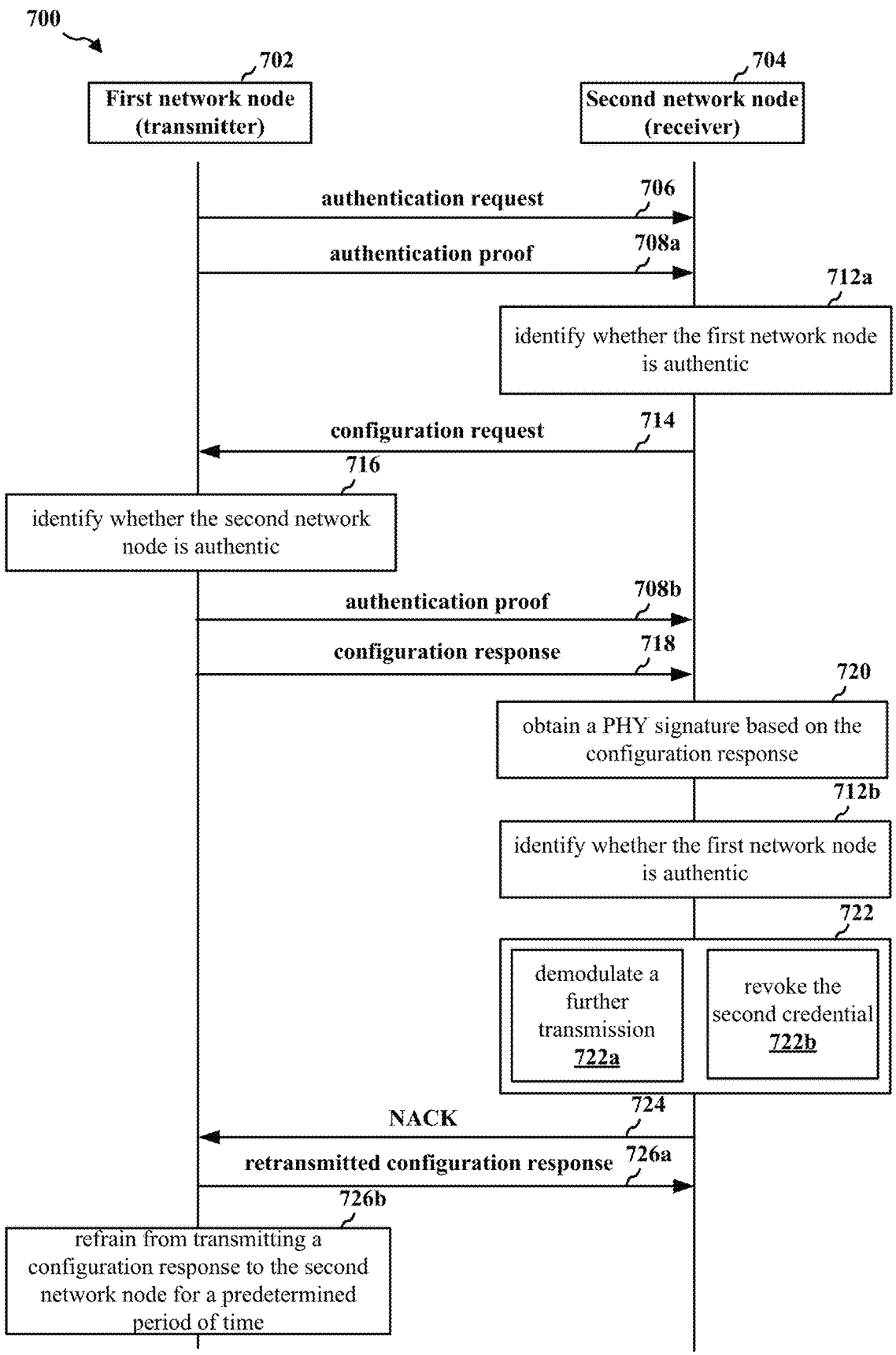
FIG. 7 is a diagram of a communication flow of a method of wireless communication, in accordance with various aspects of the present disclosure.

FIG. 7 is a diagram of a communication flow 700 of a method of wireless communication. As shown, the first network node 702 may correspond to the transmitter 504/604 and the second network node 704 may correspond to the receiver 502/602. At 706, the first network node 702 may transmit an authentication request to the second network node 704. The authentication request may include the random phase.

In one configuration, the authentication request 706 may be associated with a randomly selected beam.

At 708a or 708b, the first network node 702 may transmit an authentication proof to a second network node 704. The authentication proof may be based on a first credential associated with the first network node 702. The first network node 702 may be authenticable based on the authentication proof.

At 712a or 712b, the second network node 704 may identify whether the first network node 702 is authentic based on the authentication proof 708a or 708b.

In one configuration, the first network node 702 may be authenticable based on a distribution-based hypothesis test or a Hamming distance-based similarity test.

At 714, the second network node 704 may transmit a configuration request to the first network node 702. The configuration request may include a phase-modulated indication (i.e., a representation of (binary) data in terms of phases) of a second credential associated with the second network node 704. The configuration request may be based on the random phase. The second network node 704 may be authenticable based on the configuration request.

In one configuration, the authentication proof 708a may be transmitted by the first network node 702 to the second network node 704 prior to the configuration request 714 being received by the first network node 702 from the second network node 704. The configuration request 714 may be received by the first network node 702 from the second network node 704 based on the first network node 702 being authenticated based on the authentication proof 708a.

In one configuration, the authentication proof 708a may be further based on a time index and an uninvertible one-way function.

In one configuration, the authentication request 706 and the authentication proof 708a may be transmitted simultaneously and via different subcarriers.

In one configuration, the authentication request 706 and the authentication proof 708a may be transmitted via adjacent time-frequency resources. The authentication proof 708a may be further based on the random phase and a one-way hash function.

In one configuration, the authentication proof 708b may be transmitted by the first network node 702 to the second network node 704 after the configuration request 714 is received by the first network node 702 from the second network node 704.

In one configuration, the authentication proof 708b may be further based on the configuration request 714.

In one configuration, the authentication proof 708b may be associated with a plurality of tones.

In one configuration, the configuration request 714 and the configuration response 718 may be each associated with a plurality of tones.

In one configuration, a first transmission from the first network node 702 to the second network node 704 may be subjected to a first phase rotation (e.g., an overall phase rotation) associated with the first transmission that is reciprocal to a second phase rotation (e.g., an overall phase rotation) associated with a second transmission from the second network node 704 to the first network node 702. The second transmission may be subjected to the second phase rotation.

At 716, the first network node 702 may identify whether the second network node 704 is authentic based on the configuration request 714.

In one configuration, whether the second network node 704 is authentic may be identified based on a distribution-based hypothesis test or a Hamming distance-based similarity test.

At 718, the first network node 702 may transmit a configuration response to the second network node 704. The configuration response may include a phase-modulated confidential parameter (i.e., the confidential parameter may be represented in terms of phases) (the confidential parameter may include, e.g., parameters of the PHY technique). The configuration response may be based on the configuration request 714. The configuration response may be transmitted to the second network node 704 if the second network node 704 is identified as being authentic.

At 720, the second network node 704 may obtain a PHY signature based on the configuration response 718.

At 722, the second network node 704 may perform 722a or 722b. At 722a, the second network node 704 may demodulate a further transmission from the first network node 702 based on the PHY signature if the first network node 702 is identified as being authentic.

At 722b, the second network node 704 may revoke the second credential associated with the second network node 704 if the first network node 702 is identified as being not authentic based on the authentication proof 708b.

At 724, the first network node 702 may receive a NACK from the second network node 704 based on a CRC.

At 726a, in response to the NACK, the first network node 702 may retransmit the configuration response to the second network node 704.

At 726b, in response to the NACK, the first network node 702 may refrain from transmitting a configuration response to the second network node 704 for a predetermined period of time.

Figure 8:
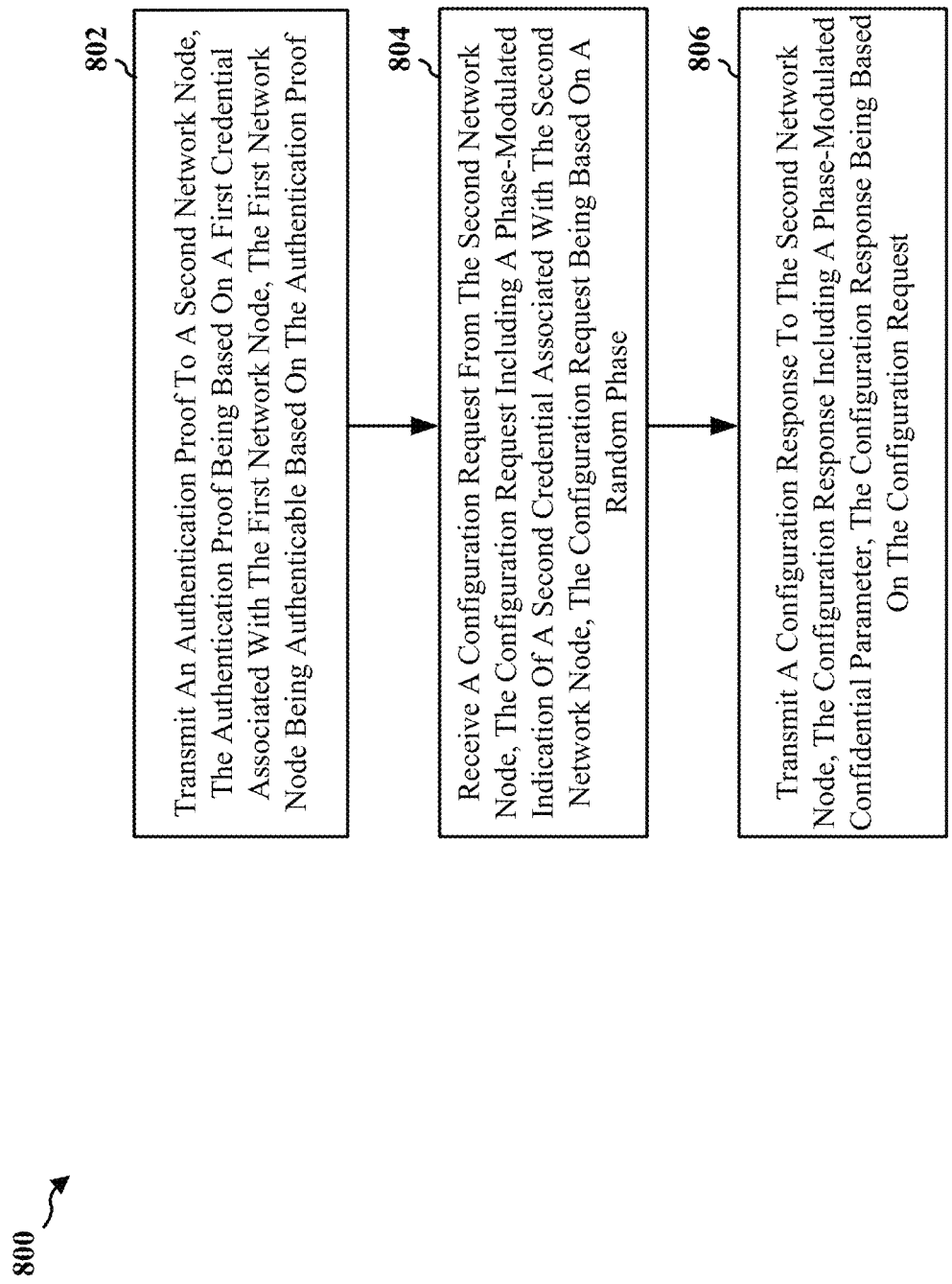
FIG. 8 is a flowchart of a method of wireless communication, in accordance with various aspects of the present disclosure.

FIG. 8 is a flowchart 800 of a method of wireless communication. The method may be performed by a base station or a first (transmitting) network node (e.g., the base station 102/310; the transmitter 504/604; the first network node 702; the network entity 1602). At 802, the first network node may transmit an authentication proof to a second network node. The authentication proof may be based on a first credential associated with the first network node. The first network node may be authenticable based on the authentication proof. For example, 802 may be performed by the component 199 in FIG. 17. Referring to FIG. 7, at 708a or 708b, the first network node 702 may transmit an authentication proof to a second network node 704.

At 804, the first network node may receive a configuration request from the second network node. The configuration request may include a phase-modulated indication of a second credential associated with the second network node. The configuration request may be based on a random phase. For example, 804 may be performed by the component 199 in FIG. 17. Referring to FIG. 7, at 714, the first network node 702 may receive a configuration request from the second network node 704.

At 806, the first network node may transmit a configuration response to the second network node. The configuration response may include a phase-modulated confidential parameter. The configuration response may be based on the configuration request. For example, 806 may be performed by the component 199 in FIG. 17. Referring to FIG. 7, at 718, the first network node 702 may transmit a configuration response to the second network node 704.

Figure 9:
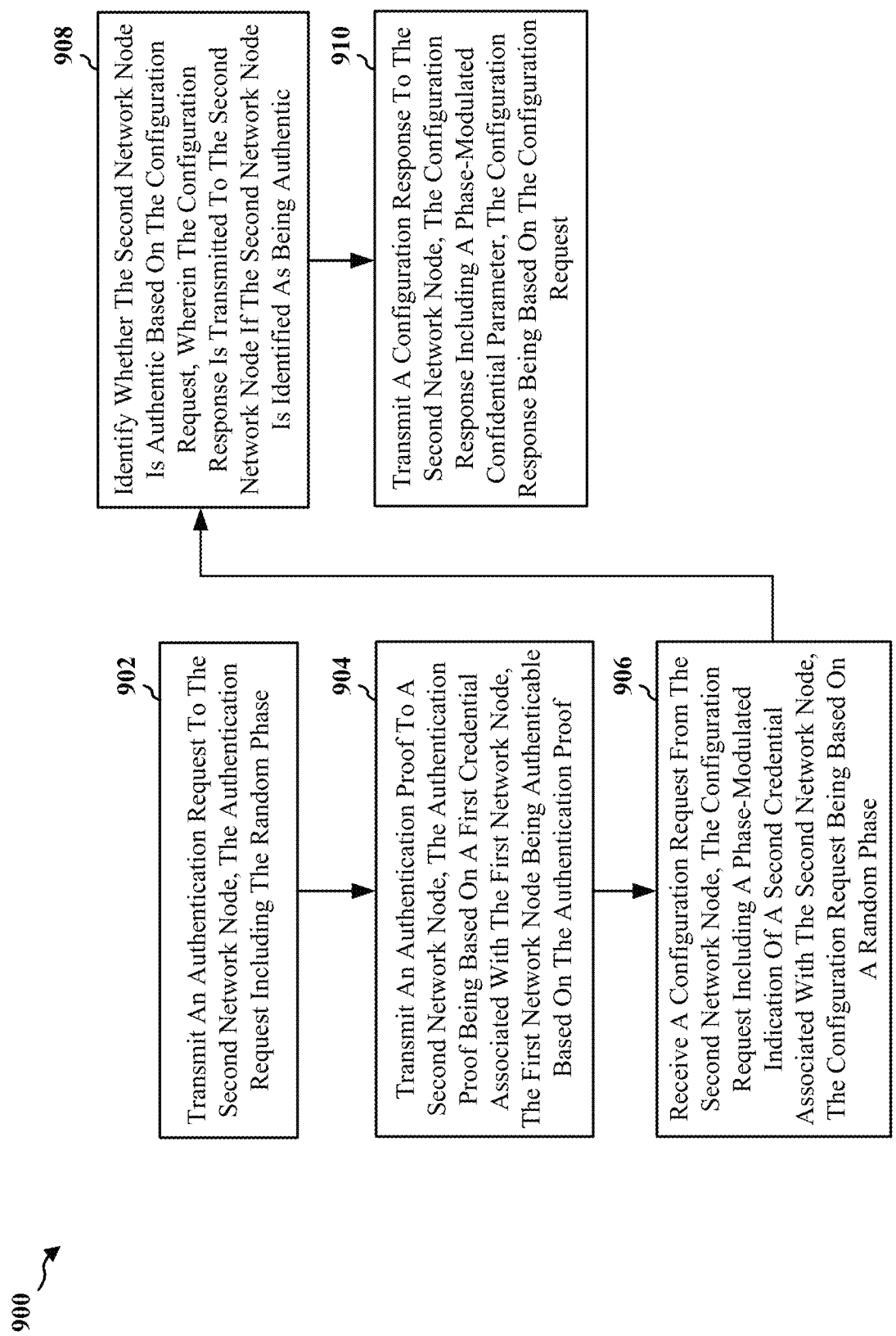
FIG. 9 is a flowchart of a method of wireless communication, in accordance with various aspects of the present disclosure.

FIG. 9 is a flowchart 900 of a method of wireless communication. The method may be performed by a base station or a first (transmitting) network node (e.g., the base station 102/310; the transmitter 504/604; the first network node 702; the network entity 1602). At 904, the first network node may transmit an authentication proof to a second network node. The authentication proof may be based on a first credential associated with the first network node. The first network node may be authenticable based on the authentication proof. For example, 904 may be performed by the component 199 in FIG. 17. Referring to FIG. 7, at 708a or 708b, the first network node 702 may transmit an authentication proof to a second network node 704.

At 906, the first network node may receive a configuration request from the second network node. The configuration request may include a phase-modulated indication of a second credential associated with the second network node. The configuration request may be based on a random phase. For example, 906 may be performed by the component 199 in FIG. 17. Referring to FIG. 7, at 714, the first network node 702 may receive a configuration request from the second network node 704.

At 910, the first network node may transmit a configuration response to the second network node. The configuration response may include a phase-modulated confidential parameter. The configuration response may be based on the configuration request. For example, 910 may be performed by the component 199 in FIG. 17. Referring to FIG. 7, at 718, the first network node 702 may transmit a configuration response to the second network node 704.

In one configuration, at 902, the first network node may transmit an authentication request to the second network node. The authentication request may include the random phase. For example, 902 may be performed by the component 199 in FIG. 17. Referring to FIG. 7, at 706, the first network node 702 may transmit an authentication request to the second network node 704.

At 908, the first network node may identify whether the second network node is authentic based on the configuration request. The configuration response may be transmitted to the second network node if the second network node is identified as being authentic. For example, 908 may be performed by the component 199 in FIG. 17. Referring to FIG. 7, at 716, the first network node 702 may identify whether the second network node 704 is authentic based on the configuration request 714.

In one configuration, referring to FIG. 7, the authentication request 706 may be associated with a randomly selected beam.

In one configuration, referring to FIG. 7, whether the second network node 704 is authentic may be identified, at 716, based on a distribution-based hypothesis test or a Hamming distance-based similarity test.

In one configuration, referring to FIG. 7, the authentication proof 708a may be transmitted to the second network node 704 prior to the configuration request 714 being received from the second network node 704. The configuration request 714 may be received from the second network node 704 based on the first network node 702 being authenticated based on the authentication proof 708a.

In one configuration, referring to FIG. 7, the authentication proof 708a may be further based on a time index and an uninvertible one-way function.

In one configuration, referring to FIG. 7, the authentication request 706 and the authentication proof 708a may be transmitted simultaneously and via different subcarriers.

In one configuration, referring to FIG. 7, the authentication request 706 and the authentication proof 708a may be transmitted via adjacent time-frequency resources. The authentication proof 708a may be further based on the random phase and a one-way hash function.

In one configuration, referring to FIG. 7, the authentication proof 708b may be transmitted to the second network node 704 after the configuration request 714 is received from the second network node 704.

In one configuration, referring to FIG. 7, the authentication proof 708b may be further based on the configuration request 714.

In one configuration, referring to FIG. 7, the authentication proof 708b may be associated with a plurality of tones.

In one configuration, referring to FIG. 7, the configuration request 714 and the configuration response 718 may be each associated with a plurality of tones.

In one configuration, referring to FIG. 7, a first transmission from the first network node 702 to the second network node 704 may be subjected to a first phase rotation associated with the first transmission that is reciprocal to a second phase rotation associated with a second transmission from the second network node 704 to the first network node 702. The second transmission may be subjected to the second phase rotation.

In one configuration, referring to FIG. 7, the first network node 702 may be authenticable based on a distribution-based hypothesis test or a Hamming distance-based similarity test.

Figure 10:
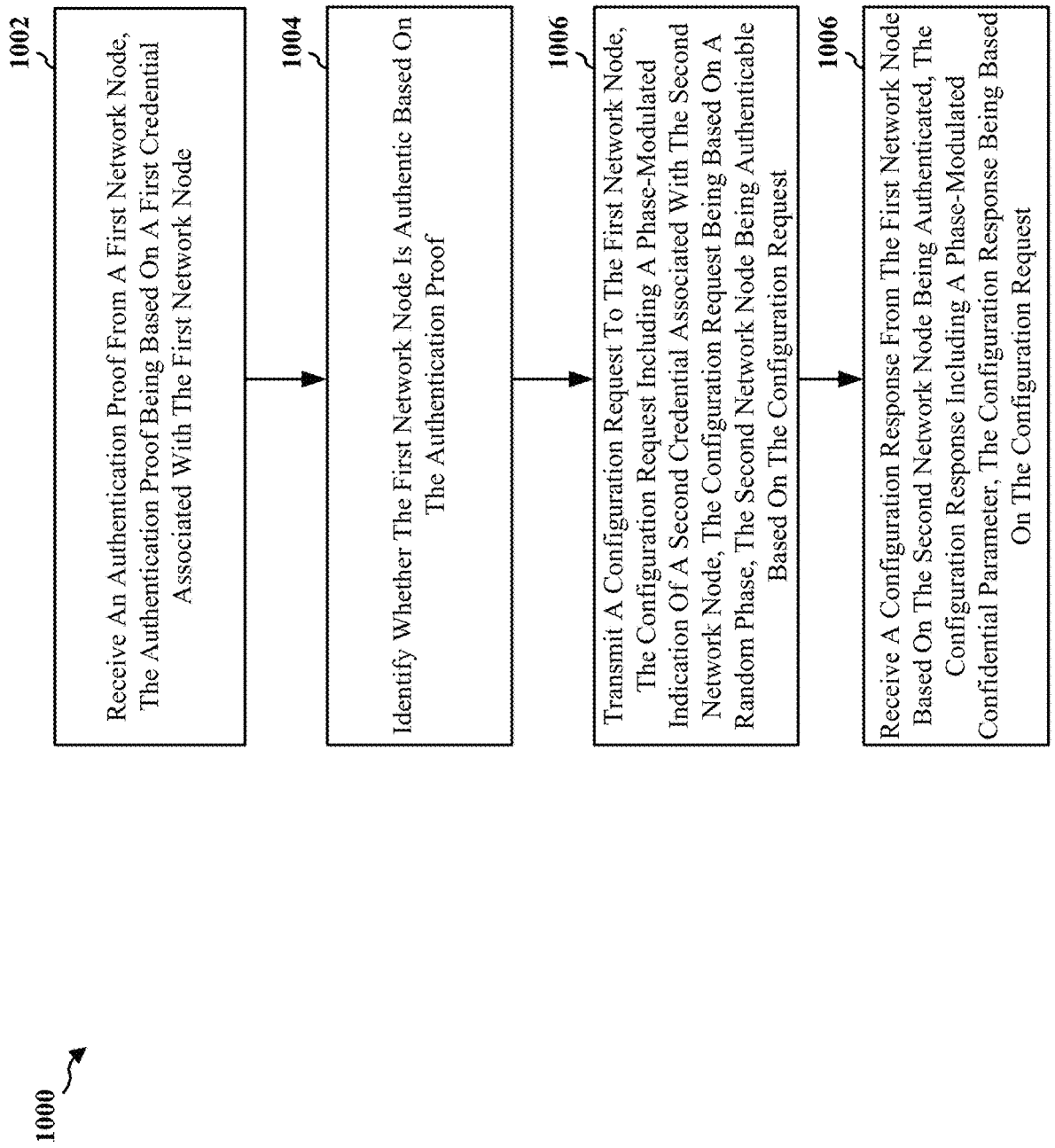
FIG. 10 is a flowchart of a method of wireless communication, in accordance with various aspects of the present disclosure.

FIG. 10 is a flowchart 1000 of a method of wireless communication. The method may be performed by a UE or a second (receiving) network node (e.g., the UE 104/350; the receiver 502/602; the second network node 704; the apparatus 1604). At 1002, the second network node may receive an authentication proof from a first network node. The authentication proof may be based on a first credential associated with the first network node. For example, 1002 may be performed by the component 198 in FIG. 16. Referring to FIG. 7, at 708a or 708b, the second network node 704 may receive an authentication proof from a first network node 702.

At 1004, the second network node may identify whether the first network node is authentic based on the authentication proof. For example, 1004 may be performed by the component 198 in FIG. 16. Referring to FIG. 7, at 712a or 712b, the second network node 704 may identify whether the first network node 702 is authentic based on the authentication proof 708a or 708b.

At 1006, the second network node may transmit a configuration request to the first network node. The configuration request may include a phase-modulated indication of a second credential associated with the second network node. The configuration request may be based on a random phase. The second network node may be authenticable based on the configuration request. For example, 1006 may be performed by the component 198 in FIG. 16. Referring to FIG. 7, at 714, the second network node 704 may transmit a configuration request to the first network node 702.

At 1008, the second network node may receive a configuration response from the first network node based on the second network node being authenticated. The configuration response may include a phase-modulated confidential parameter. The configuration response may be based on the configuration request. For example, 1008 may be performed by the component 198 in FIG. 16. Referring to FIG. 7, at 718, the second network node 704 may receive a configuration response from the first network node 702 based on the second network node 704 being authenticated.

Figure 11:
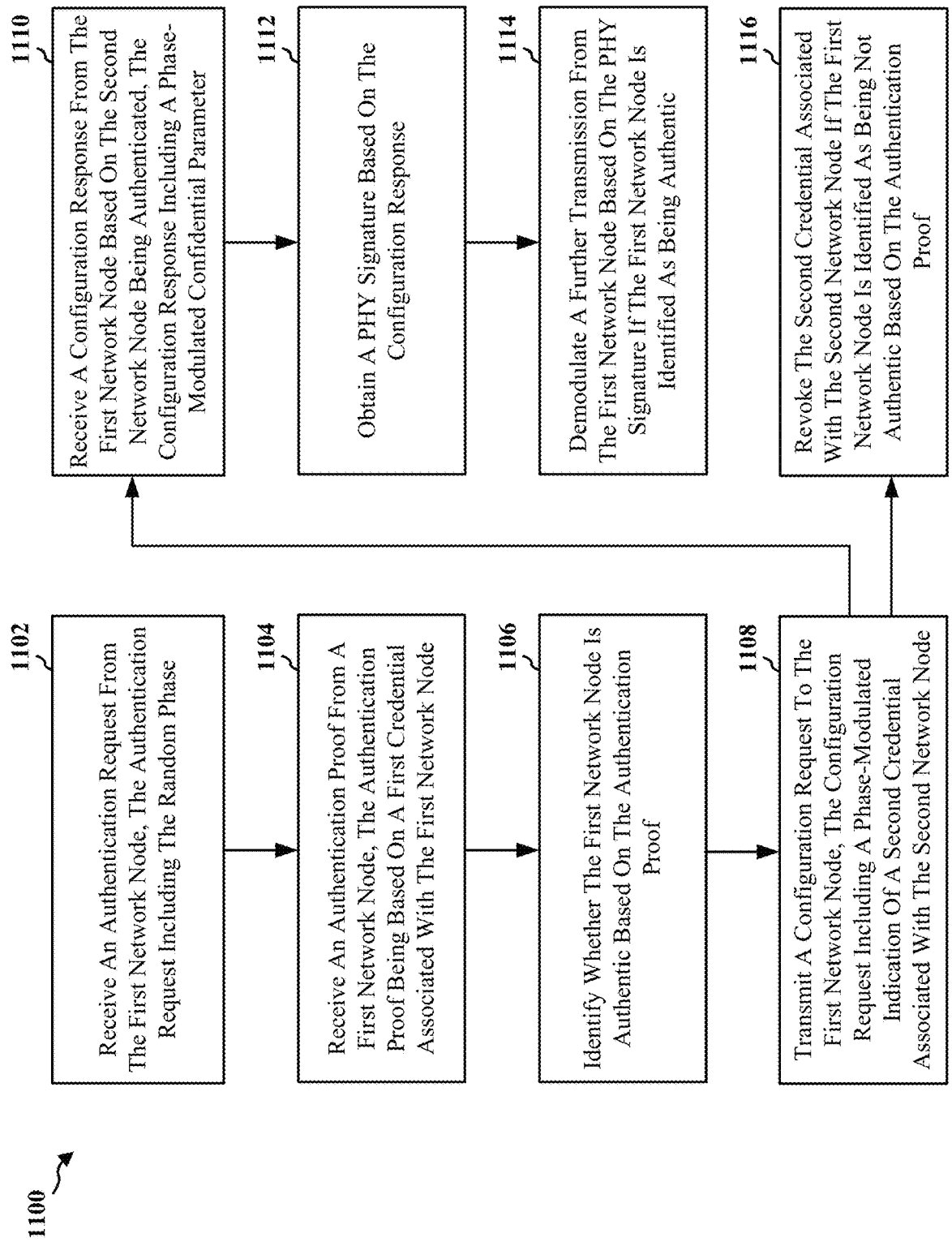
FIG. 11 is a flowchart of a method of wireless communication, in accordance with various aspects of the present disclosure.

FIG. 11 is a flowchart 1100 of a method of wireless communication. The method may be performed by a UE or a second (receiving) network node (e.g., the UE 104/350; the receiver 502/602; the second network node 704; the apparatus 1604). At 1104, the second network node may receive an authentication proof from a first network node. The authentication proof may be based on a first credential associated with the first network node. For example, 1104 may be performed by the component 198 in FIG. 16. Referring to FIG. 7, at 708a or 708b, the second network node 704 may receive an authentication proof from a first network node 702.

At 1106, the second network node may identify whether the first network node is authentic based on the authentication proof. For example, 1106 may be performed by the component 198 in FIG. 16. Referring to FIG. 7, at 712a or 712b, the second network node 704 may identify whether the first network node 702 is authentic based on the authentication proof 708a or 708b.

At 1108, the second network node may transmit a configuration request to the first network node. The configuration request may include a phase-modulated indication of a second credential associated with the second network node. The configuration request may be based on a random phase. The second network node may be authenticable based on the configuration request. For example, 1108 may be performed by the component 198 in FIG. 16. Referring to FIG. 7, at 714, the second network node 704 may transmit a configuration request to the first network node 702.

At 1110, the second network node may receive a configuration response from the first network node based on the second network node being authenticated. The configuration response may include a phase-modulated confidential parameter. The configuration response may be based on the configuration request. For example, 1110 may be performed by the component 198 in FIG. 16. Referring to FIG. 7, at 718, the second network node 704 may receive a configuration response from the first network node 702 based on the second network node 704 being authenticated.

In one configuration, at 1102, the second network node may receive an authentication request from the first network node. The authentication request may include the random phase. For example, 1102 may be performed by the component 198 in FIG. 16. Referring to FIG. 7, at 706, the second network node 704 may receive an authentication request from the first network node 702.

At 1112, the second network node may obtain a PHY signature based on the configuration response. For example, 1112 may be performed by the component 198 in FIG. 16. Referring to FIG. 7, at 720, the second network node 704 may obtain a PHY signature based on the configuration response 718.

At 1114, the second network node may demodulate a further transmission from the first network node based on the PHY signature if the first network node is identified as being authentic. For example, 1114 may be performed by the component 198 in FIG. 16. Referring to FIG. 7, at 722a, the second network node 704 may demodulate a further transmission from the first network node 702 based on the PHY signature if the first network node 702 is identified as being authentic.

In one configuration, referring to FIG. 7, the authentication request 706 may be associated with a random beam.

In one configuration, referring to FIG. 7, the authentication proof 708a may be received from the first network node 702 prior to the configuration request 714 being transmitted to the first network node 702. The configuration request 714 may be transmitted to the first network node 702 if the first network node is identified as being authentic based on the authentication proof 708a.

In one configuration, referring to FIG. 7, the authentication proof 708a may be further based on a time index and an uninvertible one-way function.

In one configuration, referring to FIG. 7, the authentication request 706 and the authentication proof 708a may be received simultaneously and via different subcarriers.

In one configuration, referring to FIG. 7, the authentication request 706 and the authentication proof 708a may be received via adjacent time-frequency resources. The authentication proof 708a may be further based on the random phase and a one-way hash function.

In one configuration, referring to FIG. 7, the authentication proof 708b may be received from the first network node 702 after the configuration request 714 is transmitted to the first network node 702.

In one configuration, referring to FIG. 7, the authentication proof 708b may be further based on the configuration request 714.

In one configuration, at 1116, the second network node may revoke the second credential associated with the second network node if the first network node is identified as being not authentic based on the authentication proof. For example, 1116 may be performed by the component 198 in FIG. 16 Referring to FIG. 7, at 722b, the second network node 704 may revoke the second credential associated with the second network node 704 if the first network node 702 is identified as being not authentic based on the authentication proof 708b.

In one configuration, referring to FIG. 7, the authentication proof 708b may be associated with a plurality of tones.

In one configuration, referring to FIG. 7, the configuration request 714 and the configuration response 718 may be each associated with a plurality of tones.

In one configuration, referring to FIG. 7, a first transmission from the first network node 702 to the second network node 704 may be subjected to a first phase rotation associated with the first transmission that is reciprocal to a second phase rotation associated with a second transmission from the second network node 704 to the first network node 702. The second transmission may be subjected to the second phase rotation.

In one configuration, referring to FIG. 7, whether the first network node 702 is authentic may be identified based on a first distribution-based hypothesis test or a first Hamming distance-based similarity test. The second network node 704 may be authenticable based on a second distribution-based hypothesis test or a second Hamming distance-based similarity test.

Figure 12:
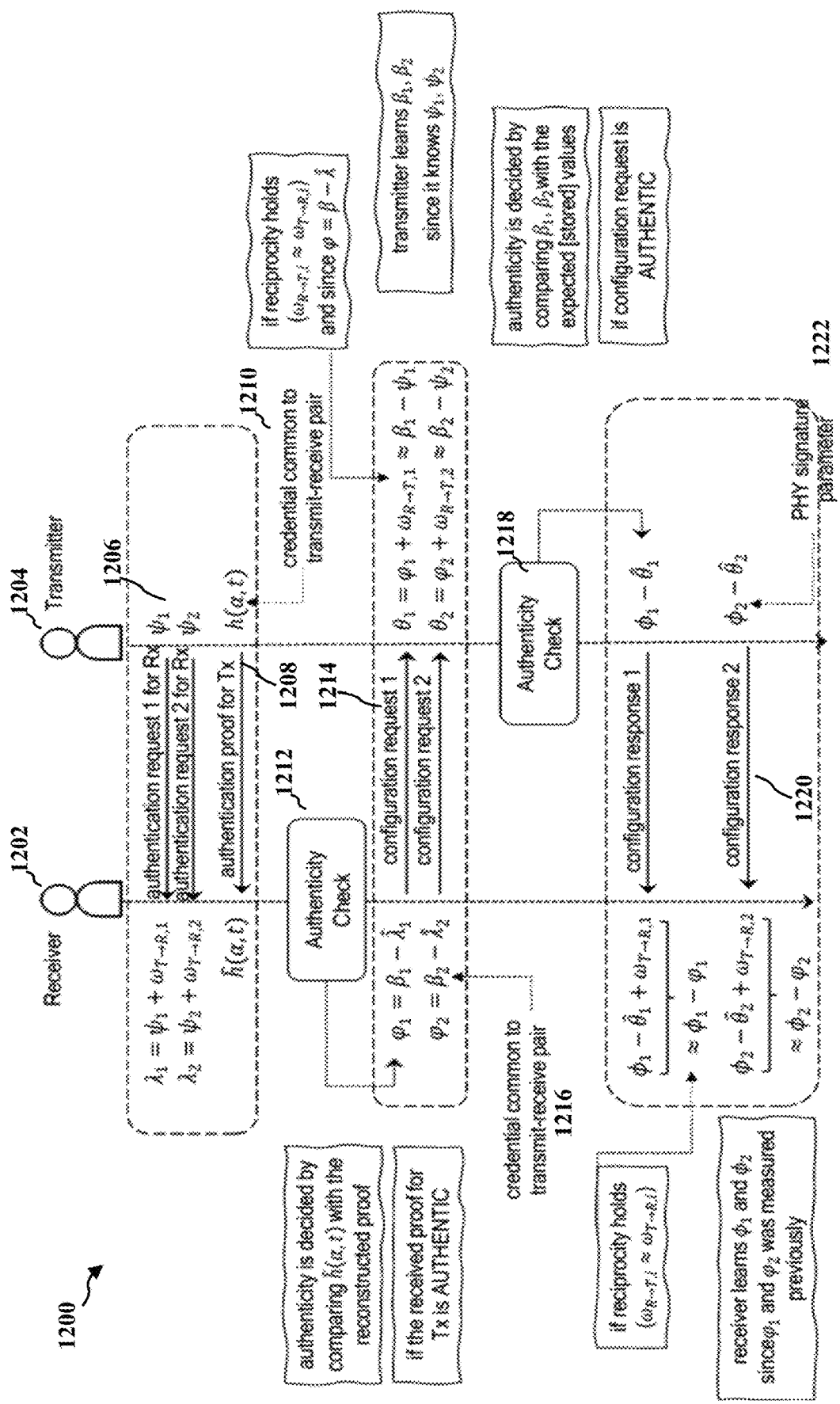
FIG. 12 is a diagram illustrating an example process for secure and reliable configuration sharing using MIMO signals according to one or more aspects.

FIG. 12 is a diagram illustrating an example process 1200 for secure and reliable configuration sharing according to one or more aspects. The legitimate receiver 1202 and the legitimate transmitter 1204 may be referred to simply as the receiver 1202 and the transmitter 1204. Although in some aspects herein the receiver 1202 may correspond to a UE (e.g., a UE 104) and the transmitter 1204 may correspond to a base station (e.g., a base station 102), the disclosure is not so limited. In different configurations, the receiver 1202 and the transmitter 1204 may correspond to network nodes of any suitable types, as appropriate.

As shown, at 1206, the transmitter 1204 may send any two or more authentication requests to the receiver 1202 over two or more MIMO signal paths. The authentication requests 1206 may each include a random phase ψ (e.g., an arbitrary phase between 0 and 360 degrees). In some aspects, the phases ψi may be known to the transmitter 1204 but not to the receiver 1202. In one or more aspects, a new phase values ψi may be selected by the transmitter 1204 each time a new authentication request is sent at 1206 (e.g., to prevent the replay attack, that is, to prevent an adversarial device from recording the authentication response to deceive the receiver 1202 later on). Further, in one or more aspects, the transmitter 1204 may use a different beam each time the transmitter 1204 sends a new authentication request at 1206. In particular, the transmitter 1204 may choose the beam randomly (e.g., also to prevent the replay attack).

As an example, the transmitter 1204 can send multiple authentication requests (for example 1 and 2, as shown in FIG. 12) along multiple MIMO paths to the receiver 1202, which is composed of random phases $\psi_1$ and $\psi_2$. Each MIMO path is a signal path between the transmitter and receiver and multiple MIMO paths are spatially separated. In some examples, the random phases $\psi_1$ and $\psi_2$ need to be known only by the transmitter. Although FIG. 12 shows an example that uses both $\psi_1$ and $\psi_2$, some examples may instead use relative phases. As an example, if there are two random phases, the difference between the phases may be used as an authentication request parameter. In examples in which there are more than two MIMO paths, via which more than two random phases are transmitted, the relative differences between one of the random phases and the other random phases may be used as an authentication request parameter, which may reduce the impact of possible phase noise.

At 1208, the transmitter 1204 may send an authentication tag (also referred to as the authentication proof of the transmitter 1204) h(α, t) to the receiver 1202, where α 1210 may be the credentials of the transmitter 1204 and t may be a time index (e.g., a sequence number—to prevent replay attacks). In particular, α 1210 may be known (a priori) by the receiver 1202. Although not shown in FIG. 12, in some examples, two or more authentication tags may be transmitted as the authentication proof (e.g., one authentication tag for each MIMO channel).

In one or more aspects, the one or more authentication tags (e.g., the authentication proof 1208) may be generated using any number of uninvertible one-way functions (e.g., a hash function) h(•) to conceal the content lest the authentication tags/proof 1208 that may be captured by an adversarial device. Because h(•) is an uninvertible one-way function, an adversarial device may not learn the content (i.e., the input to h(•)) of h(•) even if the authentication tag/proof 1208 is captured by an adversarial device.

The receiver 1202 may obtain the estimate of the received one or more authentication tag as one or more instances of ĥ(α, t) (e.g., one per authentication tag), which may be performed in a coherent fashion by employing additional pilot resources used to estimate the channel first (the fashion in which the received authentication tag is estimated may be referred to as coherent because the channel estimate is utilized). Then, to perform the authenticity check 1212 to authenticate the transmitter 1204, the receiver 1202 may compare the estimated one or more ĥ(α, t) instances against a reconstructed version of the one or more h(α, t) instances (as any number of discrete α values 1210 are available to the receiver 1202 and corresponding values of t for each α are tracked by the receiver 1202, the receiver 1202 may reconstruct a version of the instances of h(α, t) on its own). In one or more aspects, to decide, at 1212, on the legitimacy of the transmitter 1204, the comparison may be based on a distribution-based hypothesis test and/or a Hamming-distance-based similarity test. Thereafter, the receiver 1202 may continue with sending its own credentials if the transmitter 1204 is confirmed as legitimate based on the authenticity check 1212. Otherwise, if the transmitter cannot be authenticated, the receiver 1202 may stop participating in the configuration sharing process.

In one or more aspects, the each phases ψi and corresponding authentication tag h(αi, t) may be transmitted, in a paired fashion, simultaneously by the transmitter 1204 on different subcarriers of a given MIMO communication path. In additional configurations, each random phase ψi and the corresponding authentication tag h(αi, t) may be transmitted using adjacent time-frequency resources on a given MIMO communication path so that the receiver 1202 may correlate the two transmissions to assume both are coming from the same source (i.e., the transmitter 1204).

As a response to sending a ψi (e.g., $\psi_1$ or $\psi_2$) by the transmitter 1204 at 1206, the phase output of the channel at the receiver 1202 may become $\lambda=\varphi+\omega_{T\to R}$, where $\omega_{T\to R}$ may be the phase rotation due to the RF front-end and (propagation over) the channel. The receiver 1202 may measure λ as $\hat{\lambda}$. Such a measurement may be performed for each $\psi_i$ received from the transmitter 1204. As an example, the phase outputs of the channel at receiver (as a response to sending $\psi_i$) becomes $\lambda_i=\psi_i+\omega_{T\to R,i}$ where $\omega_{T\to R,i}$ is the phase rotation due to the RF front-end and (propagation over) channel of MIMO path i and the receiver measures it as $\hat{\lambda}i$. Accordingly, the receiver 1202 may prepare the authentication response consisting of the phase value $\varphi_i=\beta_i-\hat{\lambda}_i$ where $\beta_i$ may be phase-modulated credential (independent of α or $\alpha_i$) known also by the transmitter, and sends it back to the transmitter 1204 along each MIMO path i.

Even if an adversarial device is able to measure the transmitted phase $\varphi i=\beta i-\hat{\lambda}\tau$, the adversarial device may not learn the phase βi 1216 representing the credential of the receiver 1202 because the adversarial device may not know $\hat{\lambda}\tau$ (the various $\hat{\lambda}\tau$ values are the values measured at the receiver 1202 but not at other devices). Therefore, the authentication response included in the configuration request 1214 may be PHY-secure.

Additionally or alternatively, in some examples, rather than using discrete βi values, relative values between β values of different MIMO communication paths may be used as authentication parameters. As an example, if there are two MIMO communication paths, the difference between $\beta_1$ used for one path and $\beta_2$ used for the other path may be used as an authentication parameter.

In some examples, for the phase values $\varphi_i$, the respective phases for the configuration requests 1214 at the transmitter 1204 may each be $\theta=\varphi+\omega_{R\to T}$ (e.g., $\theta_i=\varphi_i+\omega_{R\to T,i}$), which may be equivalent to βi–ψi due to channel reciprocity between the authentication request 1206 and the authentication response/configuration request 1214 (i.e., $\omega_{R\to T}\approx\omega_{T\to R}$) and the fact that $\varphi=\beta-\hat{\lambda}$, for each respective MIMO channel i. In some examples, the impact of phase noise: $\omega_{R\to T,i}$ and $\omega_{T\to R,i}$ are different because different phase noise between the two parties (e.g., the transmitter 1204 and receiver 1202) as transmitters, or as receivers, or between the transmitting and receiving component of each party, and/or because phase noise changes with time, but $\omega_{R\to T,i}$ and $\omega\_(T\to R,i$ are measured at different times. However, in some examples, the phase noise can be considered as the same across the multiple MIMO paths; therefore, the relative phases are reciprocal even with phase noise as long as the radio frequency signal used for the multiple paths are from the same radio frequency source: $\omega_{R\to T,1} - \omega_{R\to T,i} = \omega\_(T\to R,1 - \omega_{T\to R,i}$.

The transmitter 1204 may measure the received phases for each MIMO path as $\theta_i \approx \beta_i - \psi i$. Because the initial random phases $\psi i$ for the MIMO communication paths are known to the transmitter 1204, the transmitter 1204 may readily obtain the phases $\beta i$ 1216 representing the credentials of the receiver 1202 from the authentication response/configuration request 1214. Further, because the $\beta i$ values 1216 (e.g., $\beta_1$ and $\beta_2$ shown in FIG. 12) are known a priori to the transmitter 1204, the transmitter 504 may perform the authenticity check 1218 by comparing the @ values obtained from the phase output against the known/expected $\beta$ values. In particular, the authenticity check 1218 may be based on an authentication test (e.g., a distribution-based hypothesis test, a Hamming distance-based similarity test, etc.) to determine whether each received credential Bi matches the known/expected credential Bi. If each of the received phases Bi 1216 pass the authentication test, the receiver 1202 may be authenticated to the transmitter 1204. Accordingly, the transmitter 1204 may then start the procedure to transmit the configuration. Otherwise, if the receiver 1202 is not authenticated, the transmitter 1204 may stop participating in the configuration process. In some examples, rather than measuring discrete values of $\theta$ for the MIMO paths, relative values representing the difference between the $\theta$ values for different MIMO paths may be used, allowing for relative difference between expected $\beta$ values to be used to determine if the authenticity check 1218 is passed. As an example, $\theta_1 - \theta_2$ may be used to infer $\beta_1 - \beta_2$. In some examples, with more than two MIMO paths, $\theta_1 - \theta_i$ may be used to infer $\beta_1 - \beta_i$.

If the authentication (i.e., the authenticity check at 1218) completes successfully, at 1220, the transmitter 1204 may send the confidential configuration to the authenticated receiver 1202 in a PHY-secure fashion (e.g., using a phase difference-based technique). Therefore, the transmitter 1204 may treat the authentication responses at 1214 as configuration requests, and may prepare the configuration responses 1220 to include the configuration represented by a phase-modulated parameter $\phi$ for each MIMO path (e.g., $\phi_i$ for each MIMO path i). The configuration responses 1220 may be transmitted by the transmitter 1204 in response to configuration requests 1214, and may include the requested configuration. The transmitter 1204 may then construct the configuration responses 1220 based on the phase value $\phi i - \hat{\theta}\tau$, where each $\hat{\theta}\tau$ 1222 (e.g., corresponding to each MIMO path) may be the phase estimate of the channel output for the configuration request on a given MIMO path. Even if the phase $\phi i - \hat{\theta}\tau$ is measured by an adversarial device, the adversarial device may not learn the phase $\phi i$ 1222 because the adversarial device may not know $\hat{\theta}\tau$. As a result, the adversarial device may not learn the confidential configuration data represented by the phases $\phi i$ 1222. Therefore, the configuration responses 1220 may be PHY-secure. In some examples with two MIMO paths, $\phi_1 - \phi_2$ may be used for the actual information, rather than discrete values of $\phi_1$ and $\phi_2$. In some examples, with more than two MIMO paths, $\phi_1 - \phi_i$ may be used.

The respective phase for the configuration responses 1220 at the receiver 1202, for each MIMO path used, may then become $\phi - \hat{\theta} + \omega_{T\to R}$, which similarly may be equivalent to $\phi - \phi$ due to channel reciprocity per MIMO path (i.e., $\omega_{R\to T} \approx \omega_{T\to R}$) and the fact that, for each MIMO path, each respective $\theta = \phi + \omega_{R\to T}$. In some examples, for each MIMO path i based on $\omega_{R\to T,1} - \omega_{R\to T,i} = \omega_{T\to R,1} - \omega_{T\to R,i}$ with presence of phase noise, $(\phi_1 - \hat{\theta}_1 + \omega_{T\to R,1}) - (\phi_i - \hat{\theta}_i + \omega_{T\to R,i})$ becomes down to $(\phi_1 - \phi_1) - (\phi_i - \phi_i)$.

In some examples, for each MIMO path, the estimate of the residual phase $\phi - \phi$ may then be exploited by the receiver 1202 to learn the configuration via the related parameters $\phi i$ (e.g., di 1222) because the value $\phi$ for each MIMO path is already known to the receiver 1202 (the receiver, for each MIMO path, may construct $\phi = \beta - \hat{\lambda}$ while forming authentication response/configuration requests 1214). In some examples, for each MIMO path i, based on $\omega_{R\to T,1} - \omega_{R\to T,i} = \omega_{T\to R,1} - \omega_{T\to R,i}$ with presence of phase noise, $(\phi_1 - \hat{\theta}_1 + \omega_{T\to R,1}) - (\phi_i - \hat{\theta}_i + \omega_{T\to R,i})$ becomes down to $(\phi_1 - \phi_1) - (\phi_i - \phi_i)$ and $\beta_1 - \beta_i$ can be inferred.

In one or more aspects, for each MIMO path, the phase parameters $\beta$ and $\phi$ each may be multiple bits long. Accordingly, multiple tones may be used in the frequency domain to transmit each of the phase parameters $\beta$ and $\phi$ during the transmissions of the configuration requests 1214 and the configuration responses 1220, respectively.

In one example, the random phase $\psi$ for each MIMO path, and a corresponding authentication tag/proof $h(\alpha,t)$ (or multiple authentication tags $h(\alpha_i, t)$ corresponding to different MIMO paths i) may be transmitted by the transmitter 1204 simultaneously (e.g., on different subcarriers of an OFDM symbol). In one or more aspects, the receiver 1202 may assume that the OFDM symbol carrying a valid $h(\alpha, t)$ is coming from a legitimate transmitter, and therefore may use the phase measured at subcarriers (of the same OFDM symbol) corresponding to $\psi$ when constructing configuration request 1214.

In a different example, for each separate MIMO path i, the phase $\psi i$ and authentication tag/proof $h(\alpha i, t)$ may be transmitted by the transmitter 1204 in adjacent time or frequency. Accordingly, the receiver 1202 may correlate the two transmissions (e.g., based on the locations of the time-frequency resources) to ensure that both are coming from the same transmitter. Therefore, in one configuration, the transmitter 1204 may produce the authentication tag/proof for each MIMO path i as $h(\alpha, t, \psi i)$ (i.e., the authentication tag/proof may be based on vi as well), or as separate authentication tags $h(\alpha i, t i, \psi i)$ in examples using separate authentication tags for the various MIMO paths. Further, the receiver 1202 may obtain or estimate a given value for a given MIMO path, $\psi i$. Accordingly, the receiver 1202 may produce the authentication responses/configuration requests 1214 corresponding to a particular $\psi$ if the corresponding authentication tag/proof $h(\alpha, t, \psi)$ transmitted by the transmitter 1204 in another time-frequency resource (e.g., an adjacent resource) is valid (i.e., if the transmitter 1204 is authenticated). Therefore, the time-frequency resources used to transmit $\psi$ at 1206 and $h(\alpha, t, \psi)$ at 1208 may be correlated (tied). Therefore, the transmitter 1204 may allocate additional subcarriers (along with the subcarriers carrying $\psi$) to send pilot symbols to help the receiver 1202 estimate first the channel and then $\psi$ for each MIMO channel being used. Based on the estimated $\psi$ for a given MIMO channel, the receiver 1202 may then locally generate, for each MIMO path, a version of the authentication proof $h(\alpha, t, \psi)$ for that MIMO path, and may perform the authentication test at 1212. The receiver 1202 may generate the authentication responses/configuration requests 1214 using the corresponding phase response for the MIMO path associated with the relevant ψ if authentication at 1212 is valid (i.e., if the transmitter 1204 is authenticated).

In one or more aspects, for each MIMO path, because the randomness of the corresponding authentication proof h(α, t, ψ) may be well provided by ψ, the time dependency for the MIMO path may be dropped without exposing the receiver 1202 to a replay attack. In other words, at 1208, h(α, ψ) for a particular MIMO path may be used without exposing the receiver 1202 to replay attacks.

Figure 13:
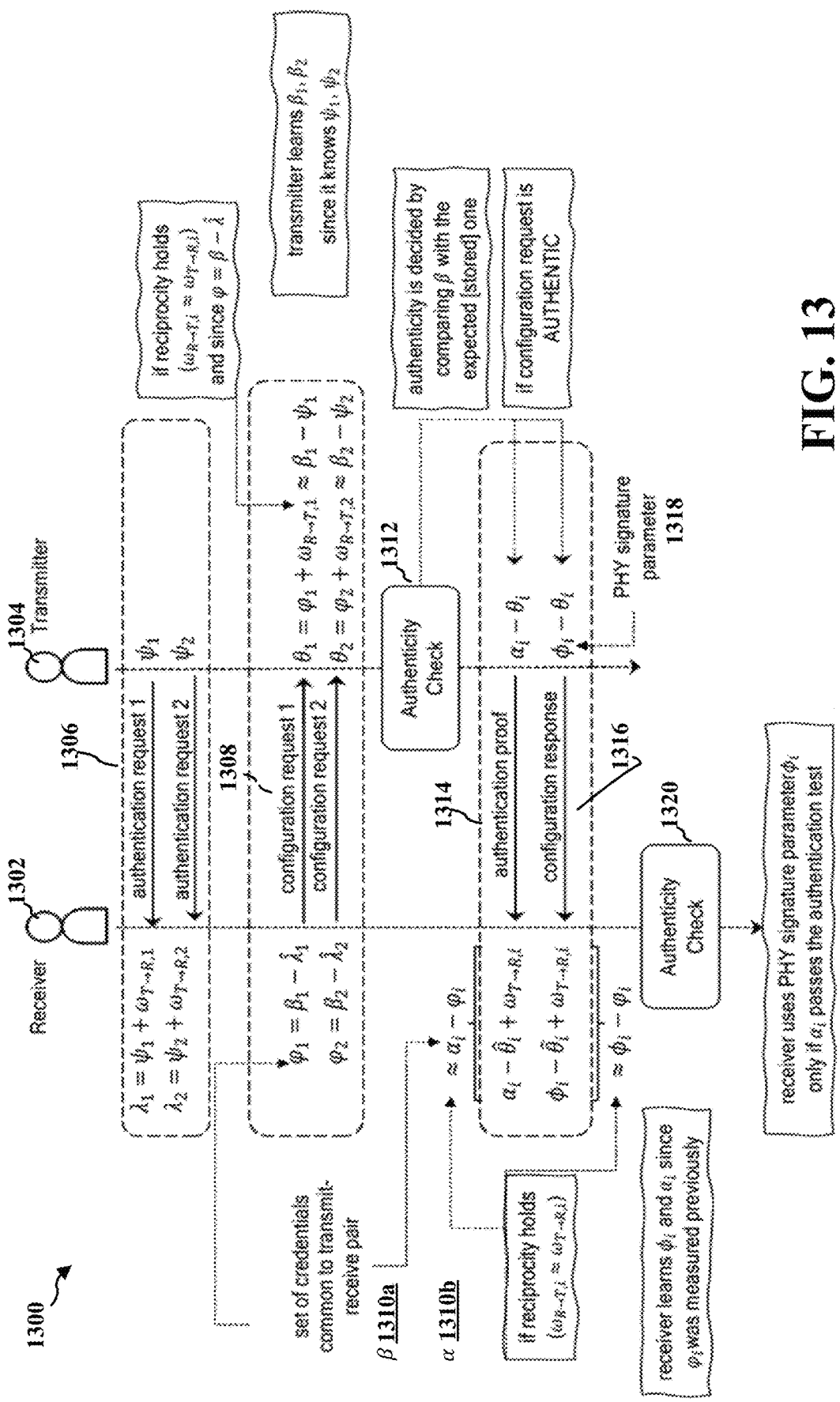
FIG. 13 is a diagram illustrating an example process for secure and reliable configuration sharing using MIMO signals according to one or more aspects.

FIG. 13 is a diagram illustrating an example process 1300 for secure and reliable configuration sharing according to one or more aspects. The legitimate receiver 1302 and the legitimate transmitter 1304 may be referred to simply as the receiver 1302 and the transmitter 1304. Although in some aspects herein the receiver 1302 may correspond to a UE (e.g., a UE 104) and the transmitter 1304 may correspond to a base station (e.g., a base station 102), the disclosure is not so limited. In different configurations, the receiver 1302 and the transmitter 1304 may correspond to network nodes of any suitable types, as appropriate.

At 1306, the transmitter 1304 may send two more authentication requests to the receiver 1302 using separate MIMO communication paths i. Each authentication request 606 may include a random phase ψi corresponding to one of the MIMO paths. As an example, in the example shown in FIG. 13, there are two MIMO communication paths, 1 and 2, having corresponding random phase values $\psi_1$ and $\psi_2$ for two authentication requests. In one or more aspects, the phases ψi may be known to the transmitter 1304 but not to other devices. In one or more aspects, a new phase value ψi for each MIMO path may be selected by the transmitter 1304 each time a new authentication request is sent at 1306 (e.g., to prevent the replay attack, thereby preventing an adversarial device from recording the authentication response to deceive the receiver 1302 at a later time). Further, in one or more aspects, the transmitter 1304 may use a different beam each time the transmitter 604 sends a new authentication request at 1306 for the various MIMO channels. In particular, the transmitter 1304 may choose the beam randomly (e.g., also to prevent the replay attack). In some examples, each random phase ψ for each MIMO path is used as part of an authentication parameter. In other examples, differences between the random phases may be used as an authentication parameter. As an example, in a scenario where there are two MIMO paths, only $\psi_1 - \psi_2$ are used as the authentication parameter, instead of both $\psi_1$ and $\psi_2$. In some examples, if there are more than two paths, $\psi_1 - \psi_i$ for all i>1 can be used as the authentication parameter; where i is the MIMO path index. In some examples, a motivation for using relative phases is to reduce the impact from the phase noise because of the correlation in the phase noise seen by the receivers of the multiple MIMO paths.

As a response to sending each value of ψ for the various MIMO paths, by the transmitter 1304, the phase output of the channel at the receiver 1302 for each MIMO path i may become $\lambda i = \psi i + \omega_{T \to R,i}$, where $\omega_{T \to R,i}$ may be the phase rotation due to the radio frequency front-end and (propagation over) the channel, The receiver 602 may measure λ as $\hat{\lambda}$ for each MIMO channel (e.g., λi may be for each MIMO path i).

Accordingly, the receiver 1302 may prepare authentication responses for each MIMO path including the phase value $\phi i = \beta i - \hat{\lambda} \tau$, where each βi 1310a may be the phase-modulated credential of the receiver 1302 known also by the transmitter 1304. The phase β 1310a for a given MIMO channel representing a credential of the receiver 1302 may be independent from the credential α for the particular MIMO path. At 1308, the receiver 1302 may transmit a separate phase value φ for each MIMO path back to the transmitter 1304.

In some examples, for particular MIMO path, even in scenarios where an adversarial device is able to measure the transmitted phase $\phi = \beta - \hat{\lambda}$ for the MIMO path, the adversarial device may not learn the phase β for the MIMO path representing the credential of the receiver 1302 because the adversarial device may not know $\hat{\lambda}$ for the particular MIMO path (e.g., because a value of $\hat{\lambda}$ for a particular MIMO path is the value measured at the receiver 1302 but not at other devices). Therefore, the authentication responses included in the configuration requests 1308 may be PHY-secure. In some examples, rather than using the discrete values of β for each of the various MIMO paths, the relative differences between the values for the various paths may be used as an authentication parameter. As an example, in scenarios where there are two MIMO paths, only $\beta_1 - \beta_2$ may be used and known to the transmitter, and if there are more than two MIMO paths, $\beta_1 - \beta_i$ for all i>1 can be used as the authentication parameter.

The respective phase for the configuration request 1308 at the transmitter 1304 may be $\theta i = \phi i + \omega_{R \to Ti}$ for each MIMO path i, which may be equivalent, on a per-MIMO path basis, to β−ψ due to channel reciprocity between the authentication request 1306 and the configuration request 1308 (i.e., $\omega_{R \to Ti} \approx \omega_{T \to Ri}$) and the fact that $\phi i = \beta i - \hat{\lambda} \tau$ for each MIMO path. In some examples, rather than using discrete values of θ for each MIMO path, relative differences between θ values may be used to infer the differences between the β values. As an example, $\theta_1 - \theta_2$ may be used to infer $\beta_1 - \beta_2$, and if there are more than two MIMO paths, $\theta_1 - \theta_i$ may be used to infer $\beta_1 - \beta_i$.

The transmitter 1304 may measure the received phase as $\hat{\theta} \tau \approx \beta i - \psi i$ for each MIMO path i. Because the initial random phase ψ for a given MIMO path is known to the transmitter 1304, the transmitter 1304 may obtain the phase β for the particular MIMO path representing a credential of the receiver 602 from the configuration requests 1308. Further, because each β for the various MIMO paths is known a priori to the transmitter 1304, the transmitter 1304 may perform the authenticity check 1312 by comparing the various β values obtained from the phase output against known/expected β values. In particular, the authenticity check 1312 may be based on an authentication test (e.g., a distribution-based hypothesis test, a Hamming distance-based similarity test, etc.) to determine whether a given received credential β for a particular MIMO path matches the known/expected credential β for the MIMO path. If various received phase β values pass the authentication test, the receiver 1302 may be authenticated to the transmitter 1304. Accordingly, the transmitter 1304 may then start the procedure to transmit the configuration. Otherwise, if the receiver is not authenticated, the transmitter 1304 may stop participating in the process.

If the authentication (i.e., the authenticity check at 1312) completes successfully, the transmitter 1304 may send the authentication proof 1314 and the configuration response 1316 including the confidential configuration to the authenticated receiver 1302 both in a PHY-secure fashion (e.g., using a phase difference-based technique).

The authentication proof 1314 may include one or more credentials of the transmitter 1304. In particular, the one or more credentials of the transmitter 1304 may be represented by the phase-modulated credential a in the authentication proof 1314. In some examples, each MIMO path used is associated with a separate phase-modulated credential $\alpha_i$.

Further, the configuration response 1316 may include the configuration represented by a phase-modulated parameter φ. In some examples, each MIMO path used is associated with a separate phase-modulated parameter $\phi_i$.

The transmitter 1304 may construct the authentication proof 1314 and the configuration response 1316 based on phase values α–θ̂ and φ–θ̂, respectively, where θ̂ may be the phase estimate of the channel output associated with the configuration request 1308. Even if either of α–θ̂ or φ–θ̂ is measured by an adversarial device, the adversarial device may not be able to learn the concealed phases α or φ because the adversarial device may not know θ̂. Therefore, the authentication proof 1314 and the configuration response 1316 may be communicated in a PHY-secure fashion. The same may hold true on a per-MIMO path basis in examples where separate values of $\alpha_i$ and $\phi_i$ are used for separate MIMO paths. In examples using relative phases, $(\alpha_1-\hat{\theta}_1)-(\alpha_i-\hat{\theta}_i)$ and $(\phi_1-\hat{\theta}_1)-(\phi_i-\hat{\theta}_i)$ may be used in a similar manner.

The respective phase outputs for the authentication proof 1314 and the configuration response 1316 at the receiver 1302 may become $\alpha i-\hat{\theta}\tau+\omega_{T\rightarrow Ri}$ and $\phi i-\hat{\theta}\tau+\omega_{T\rightarrow Ri}$, respectively, which may be equivalent to αi–φi and φi–φi, respectively, due to channel reciprocity (i.e., $\omega_{R\rightarrow T}\approx\omega_{T\rightarrow R}$) on a per-MIMO path basis, and the fact that θi=φi+$\omega_{R\rightarrow Ti}$. Because each value $\varphi_i$ corresponding to the various MIMO paths i are available to the receiver 1302 (e.g., the receiver 1302 may construct φi=βi–λ̂τ when forming the configuration request 1308), noisy estimates of both α 1310b and φ 1318 may become available to the receiver 1302. Further, because, for a given MIMO path, α 1310b is known a priori to the receiver 1302, the receiver 1302 may perform the authenticity check 1320 by comparing the α obtained from the phase output against the known/expected α for the particular MIMO path. In particular, the authenticity check 1320 may be based on an authentication test (e.g., a distribution-based hypothesis test, a Hamming distance-based similarity test, etc.) to determine whether the received credential α matches the known/expected credential a for the particular MIMO path. If the received credential α 1310b passes the authentication test at 1320, the receiver 1302 may then conclude the legitimacy of the transmitter 1304, and may continue with learning/using the configuration (e.g., the parameters represented by φi 1318). Otherwise, if the transmitter is not authenticated, the receiver 1302 may discard the received configuration.

In one or more aspects, the phase parameters αi, βi, and φi for each MIMO path used in the authentication process (e.g., α 1310b, β 1310a and φ 1318) may be multiple bits long. Accordingly, multiple tones may be used in the frequency domain to transmit, per MIMO path, each of the phase parameters α, β, and φ (e.g., α 1310b, β 1310a and φ 1318) during the transmissions of the authentication proof 1314, the configuration requests 1308, and the configuration response(s) 1316, respectively.

In some aspects, the transmitter 1204/1304 may include (e.g., append) a cyclic redundancy check (CRC) in the phase parameter φ (e.g., using frequency domain resource blocks) for each MIMO path to enable the receiver 1202/1302 to verify the accuracy of the received phase(s) φ and, thus, the configuration. If the receiver 1202/1302 identifies a received phase φ as inaccurate based on the CRC, the receiver 1202/1302 may transmit a negative acknowledgement (NACK) to the transmitter 1204/1304. Accordingly, in some aspects, if the transmitter 1204/1304 does not receive a NACK (e.g., within a time window after a transmission), the transmitter 1204/1304 may assume that the receiver 1202/1302 has learned the configuration correctly.

If the transmitter 1204/1304 receives one or more NACKs, in one configuration, the transmitter 1204/1304 may try resharing the configuration following the same procedure as described above. In another configuration, if the transmitter 1204/1304 receives a NACK, the transmitter 1204/1304 may suspend the configuration sharing process for a preconfigured time period. In some aspects, if the suspension time period is longer than a network-selected authentication lifetime or the channel coherence time, the authentication procedure may also be repeated prior to the resumption of configuration transmission.

Due to imperfections in channel reciprocity and phase estimation on a per-MIMO path basis, the measured β–ψ, α–φ, and φ–φ for any given MIMO path and/or set of MIMO paths may be inaccurate/erroneous (e.g., deviate from correct values). Accordingly, to reduce negative effects of the deviation, in some aspects, the transmit-receive pair (e.g., the transmitter 1204/1304-receiver 1202/1302 pair) may (periodically or from time to time) exchange known phase parameters β, α, and φ for all or any portion of the MIMO paths to measure and quantify the errors between the received and the expected/correct values of β–ψ, α–φ, and φ–φ (ψ and φ are used because ψ and φ are available to respective related devices/parties).

In some aspects, the network may (dynamically or statically) set thresholds (e.g., per MIMO path) for the errors associated with β–ψ, α–φ, and φ–φ, as described above, based on whether the transmitted data is known or not known to the receiver 1202/1302. In some aspects, different thresholds may be set for the errors associated with β–ψ, α–φ, and φ–φ. In some aspects, if the error measurements for β–ψ, α–φ, and φ–φ are all below their respective thresholds for all MIMO paths being used, the phase difference-based configuration sharing process as illustrated in FIGS. 12 and 13 may be allowed. On the other hand, if at least one of the error measurements for β–ψ, α–φ, and φ–φ is below its respective threshold, the phase difference-based configuration sharing process may be suspended until at least the phase errors are measured at a future time.

Figure 14:
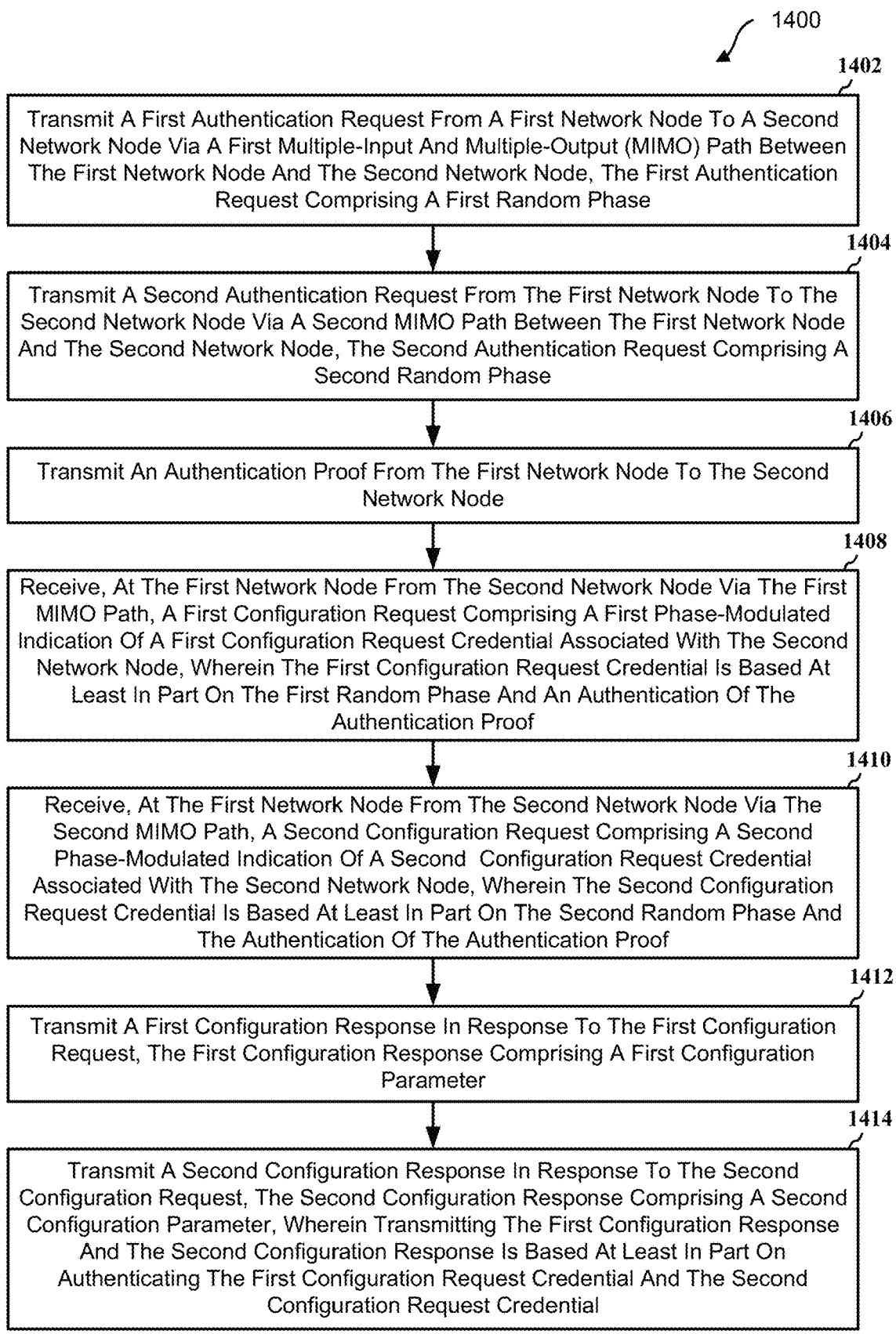
FIG. 14 is a flowchart of a method of wireless communication, in accordance with various aspects of the present disclosure.

FIG. 14 is a flow diagram illustrating an example of a process 1400 for mutual authentication in wireless communications in accordance with examples described herein. The process 1400 may be performed, at least in part, for example, by any one of the UE 104 shown in FIG. 1 and described above, the BS 102 shown in FIG. 1 and described above, the BS 310 shown in FIG. 3 and described above, the UE 350 shown in FIG. 3 and described above, the receiver 502 shown in FIG. 5 and described above, the transmitter 504 shown in FIG. 5 and described above, the receiver 602 shown in FIG. 6 and described above, the transmitter 604 shown in FIG. 6 and described above, the receiver 1202 shown in FIG. 12 and described above, the transmitter 1204 shown in FIG. 12 and described above, the receiver 1302 shown in FIG. 13 and described above, the transmitter 1304 shown in FIG. 13 and described above, the apparatus 1604 shown in FIG. 16 and described below, the network entity 1702, and/or any component or element shown in any of the aforementioned components.

At block 1402, the process 1400 includes transmitting a first authentication request from a first network node to a second network node via a first multiple-input and multiple-output (MIMO) path between the first network node and the second network node, the first authentication request comprising a first phase. The phase may be a random phase known to the transmitter but not the receiver. A new phase value may be used for each new authentication request.

At block 1404, the process 1400 includes transmitting a second authentication request from the first network node to the second network node via a second MIMO path between the first network node and the second network node, the second authentication request comprising a second phase. The phase may be a random phase known to the transmitter but not the receiver. A new phase value may be used for each new authentication request. The first authentication request and the second authentication request may be sent using separate MIMO paths, which may be spatially separated. The first and second authentication request may be separately used to verify the authenticity of the first network node. Additionally or alternatively, the relative difference between phases of the authentication requests may be used to verify the authenticity of the first network node.

At block 1406, the process 1400 includes transmitting an authentication proof from the first network node to the second network node. An authentication proof may be referred to as and/or include an authentication tag. The authentication proof may include $h(\alpha, t)$, where $\alpha$ may be the credentials of the first network node and t may be a time index (e.g., a sequence number). In some examples, $\alpha$ may be known a priori by the second network node. In some examples, two or more authentication tags may be transmitted as the authentication proof (e.g., one authentication tag for each MIMO channel).

In one or more aspects, the one or more authentication tags (e.g., the authentication proof) may be generated using any number of uninvertible one-way functions (e.g., a hash function) $h(\cdot)$ to conceal the content lest the authentication tags/proof 1208 that may be captured by an adversarial device. Because $h(\cdot)$ is an uninvertible one-way function, an adversarial device may not learn the content (i.e., the input to $h(\cdot)$) of $h(\cdot)$ even if the authentication tag/proof is captured by an adversarial device. The second network node may obtain the estimate of the received one or more authentication tags as one or more instances of $\hat{h}(\alpha, t)$ (e.g., one per authentication tag), which may be performed in a coherent fashion by employing additional pilot resources used to estimate the channel first (the fashion in which the received authentication tag is estimated may be referred to as coherent because the channel estimate is utilized). Then, to perform the authenticity check to authenticate the first network node, the second network node may compare the estimated one or more $\hat{h}(\alpha, t)$ instances against a reconstructed version of the one or more $h(\alpha, t)$ instances (as any number of discrete $\alpha$ values are available to the second network node and corresponding values of t for each $\alpha$ are tracked by the second network node, the second network node may reconstruct a version of the instances of $h(\alpha, t)$ on its own). In one or more aspects, to decide on the legitimacy of the first network node, the comparison may be based on a distribution-based hypothesis test and/or a Hamming-distance-based similarity test. Thereafter, the second network node may continue with sending its own credentials if the first network node is confirmed as legitimate based on the authenticity check. In one or more aspects, the phases $\psi i$ and corresponding authentication tag $h(\alpha i, t)$ may be transmitted, in a paired fashion, simultaneously by the first network node on different subcarriers of a given MIMO communication path. In additional configurations, each random phase $\psi i$ and the corresponding authentication tag $h(\alpha i, t)$ may be transmitted using adjacent time-frequency resources on a given MIMO communication path so that the second network node may correlate the two transmissions to assume both are coming from the same source (e.g., the first network node).

At block 1408, the process 1400 includes receiving, at the first network node from the second network node via the first MIMO path, a first configuration request corresponding to a first configuration request credential associated with the second network node, wherein the first configuration request credential is based at least in part on the first phase and an authentication of the authentication proof.

At block 1410, the process 1400 includes receiving, at the first network node from the second network node via the second MIMO path, a second configuration request corresponding to a second configuration request credential associated with the second network node, wherein the second configuration request credential is based at least in part on the second phase and the authentication of the authentication proof. The first and second configuration request credentials may be referred to, for example, as $\beta 1$ and $\beta 2$, which may be known a priori by the first network node. The first and second configuration request credentials may be combined with a phase prior to transmission to the first network node. The phase with which the configuration request credentials are combined may be based at least in part on the respective phases of the MIMO channel via which the authentication requests are received from the first network node. In some examples, the first network node derives the configuration request credentials based at least in part on the first network node being aware of the phases sent over the respective MIMO channels during the authentication requests.

At block 1412, the process 1400 includes transmitting, based at least in part on authenticating the first configuration request credential, a first configuration response in response to the first configuration request.

At block 1414, the process 1400 includes transmitting, based at least in part on authenticating the second configuration request credential, a second configuration response in response to the second configuration request.

In some examples, the configuration request credentials are derived by the first network node, and compared with configuration request credentials known to the first network node to determine if the credentials match, and the second network node is determined to be legitimate based on a successful match. In some examples, the first and second configuration responses include respective configuration parameters to be used during communication between the first and second network nodes.

Figure 15:
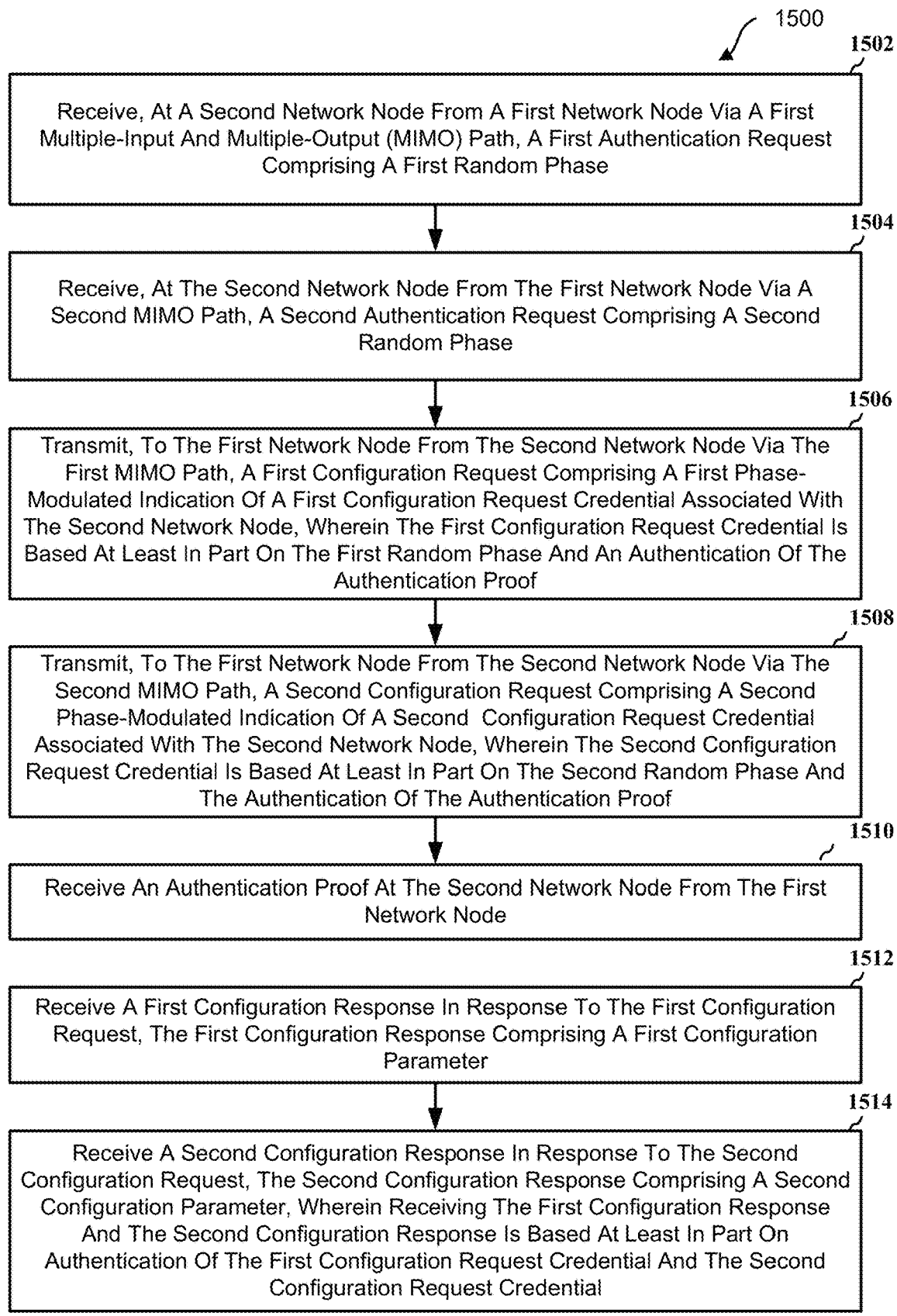
FIG. 15 is a flowchart of a method of wireless communication, in accordance with various aspects of the present disclosure.

FIG. 15 is a flow diagram illustrating an example of a process 1500 for mutual authentication in wireless communications in accordance with examples described herein. The process 1500 may be performed, at least in part, for example, by any one of the UE 104 shown in FIG. 1 and described above, the BS 102 shown in FIG. 1 and described above, the BS 310 shown in FIG. 3 and described above, the UE 350 shown in FIG. 3 and described above, the receiver 502 shown in FIG. 5 and described above, the transmitter 504 shown in FIG. 5 and described above, the receiver 602 shown in FIG. 6 and described above, the transmitter 604 shown in FIG. 6 and described above, the receiver 1202 shown in FIG. 12 and described above, the transmitter 1204 shown in FIG. 12 and described above, the receiver 1302 shown in FIG. 13 and described above, the transmitter 1304 shown in FIG. 13 and described above, the apparatus 1604 shown in FIG. 16 and described below; the network entity 1702, and/or any component or element shown in any of the aforementioned components.

At block 1502, the process 1500 includes receiving, at a second network node from a first network node via a first multiple-input and multiple-output (MIMO) path, a first authentication request comprising a first phase.

At block 1504, the process 1500 includes receiving, at the second network node from the first network node via a second MIMO path, a second authentication request comprising a second phase.

In some examples, the first and second authentication requests are send via different MIMO paths. In some examples, each authentication request includes a separate phase, which may be random phases. In some examples, the phases are known to the first network node, but not the second network node. In some examples, a new phase is selected per MIMO path by the first network node for each authentication request. In some examples, each phase is used as an authentication parameter. In some examples, the difference between phases may be used as an authentication parameter.

At block 1506, the process 1500 includes transmitting, to the first network node from the second network node via the first MIMO path, a first configuration request corresponding to a first configuration request credential associated with the second network node, wherein the first configuration request credential is based at least in part on the first phase and an authentication of the authentication proof.

At block 1508, the process 1500 includes transmitting, to the first network node from the second network node via the second MIMO path, a second configuration request corresponding to a second configuration request credential associated with the second network node, wherein the second configuration request credential is based at least in part on the second phase and the authentication of the authentication proof.

In some examples, the second network node determines a phase output corresponding to the phases received at blocks 1502 and 1506 for respective MIMO channels, where the phase outputs are based at least in part on the phases received from the first network node and characteristics of the respective MIMO paths. In some examples, the second network node prepares authentication responses to the received phases that are based on the calculated phase outputs and configuration request credentials per MIMO channel that are known a priori by the first network node. In some examples, the authentication requests are included as part of respective configuration requests per MIMO channel. In some examples, the phase measured by the first network node for the respective per-MIMO path configuration requests is equivalent to the difference between the respective configuration request credentials and the phase known to the first network node of the communications sent via the MIMO channels to the second network node. Thus, in some examples, the respective configuration request credentials may be obtained by the first network node, and compared with the expected configuration request credentials known to the first network node to determine the legitimacy of the second network node.

At block 1510, the process 1500 includes receiving an authentication proof at the second network node from the first network node. In some examples, the authentication proof is transmitted from the first network node to the second network node based on a successful verification of the configuration request credentials received at the first network node at blocks 1506 and 1508.

At block 1512, the process 1500 includes receiving, based at least in part on authentication of the first configuration request credential, a first configuration response in response to the first configuration request.

At block 1514, the process 1500 includes receiving, based at least in part on authentication of the second configuration request credential, a second configuration response in response to the second configuration request.

In some examples, the first and second configuration responses that each include respective confidential configuration information to be used at the second network node during communication with the first network node.

Figure 16:
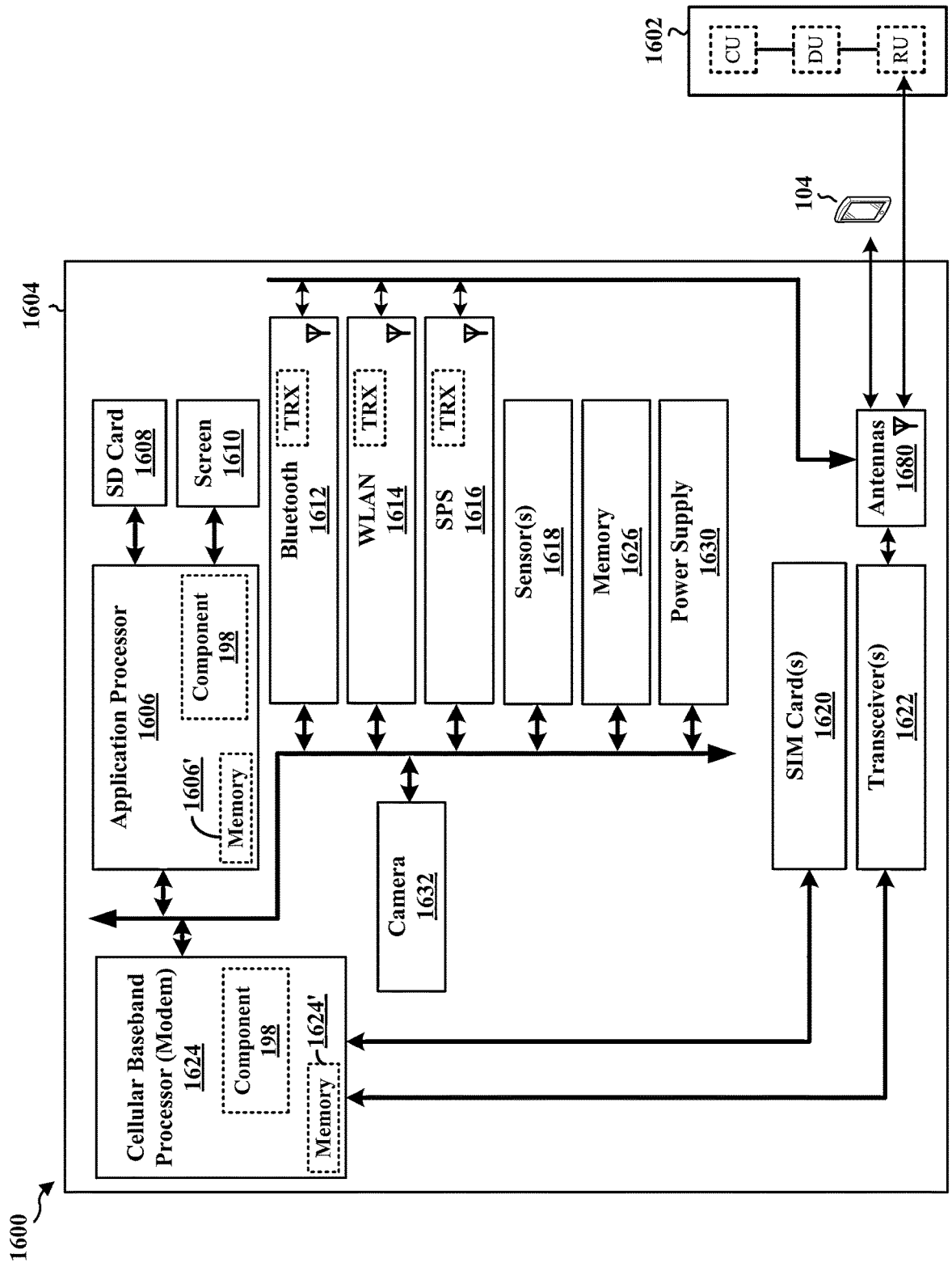
FIG. 16 is a diagram illustrating an example of a hardware implementation for an example apparatus and/or network entity, in accordance with various aspects of the present disclosure.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described herein. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see 350 of FIG. 3) and include the additional modules of the apparatus 1604.

As discussed supra, the component 198 is configured to receive one or more authentication proofs from a first network node. The one or more authentication proofs may be based on one or more credential associated with the first network node. The component 198 may be configured to identify whether the first network node is authentic based on the one or more authentication proofs. The component 198 may be configured to transmit one or more configuration requests to the first network node. The one or more configuration requests may include a phase-modulated indication of one or more second credential associated with the second network node. The one or more configuration requests may be based on one or more random phases. The second network node may be authenticable based on the one or more configuration requests. The component 198 may be configured to receive one or more configuration responses from the first network node based on the second network node being authenticated. The one or more configuration responses may include a phase-modulated confidential parameter. The one or more configuration responses may be based on the one or more configuration requests. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for receiving one or more authentication proofs from a first network node. The one or more authentication proofs may be based on one or more credentials associated with the first network node. The apparatus 1604, and in particular the cellular baseband processor 1624 and/or the application processor 1606, includes means for identifying whether the first network node is authentic based on the authentication proof. The apparatus 1604, and in particular the cellular baseband processor 1624 and/or the application processor 1606, includes means for transmitting one or more configuration requests to the first network node. The one or more configuration requests may include a phase-modulated indication of one or more second credentials associated with the second network node. The one or more configuration requests may be based on one or more random phases. The second network node may be authenticable based on the one or more configuration requests. The apparatus 1604, and in particular the cellular baseband processor 1624 and/or the application processor 1606, includes means for receiving one or more configuration responses from the first network node based on the second network node being authenticated. The one or more configuration responses may include a phase-modulated confidential parameter. The configuration response may be based on the one or more configuration requests.

In one configuration, the apparatus 1604, and in particular the cellular baseband processor 1624 and/or the application processor 1606, includes means for receiving one or more authentication requests from the first network node. The one or more authentication requests may include one or more random phases. The apparatus 1604, and in particular the cellular baseband processor 1624 and/or the application processor 1606, includes means for obtaining a PHY signature based on the configuration response. The apparatus 1604, and in particular the cellular baseband processor 1624 and/or the application processor 1606, includes means for demodulating a further transmission from the first network node based on the PHY signature if the first network node is identified as being authentic. In one configuration, the one or more authentication requests may be associated with one or more random beams. In one configuration, the one or more authentication proofs may be received from the first network node prior to the one or more configuration requests being transmitted to the first network node. The one or more configuration requests may be transmitted to the first network node if the first network node is identified as being authentic based on the one or more authentication proofs. In one configuration, the one or more authentication proofs may be further based on one or more time indexes and one or more uninvertible one-way functions. In one configuration, the one or more authentication requests and the one or more authentication proofs may be received simultaneously and via different subcarriers. In one configuration, the one or more authentication requests and the one or more authentication proofs may be received via adjacent time-frequency resources. The one or more authentication proofs may be further based on the one or more random phases and one or more one-way hash functions. In one configuration, the one or more authentication proofs may be received from the first network node after the one or more configuration requests are transmitted to the first network node. In one configuration, the one or more authentication proofs may be further based on the one or more configuration requests. In one configuration, the apparatus 1604, and in particular the cellular baseband processor 1624 and/or the application processor 1606, includes means for revoking the second credential associated with the second network node if the first network node is identified as being not authentic based on the one or more authentication proofs. In one configuration, the one or more authentication proofs may be associated with a plurality of tones. In one configuration, the one or more configuration requests and the one or more configuration responses may be each associated with a plurality of tones. In one configuration, a first transmission from the first network node to the second network node may be subjected to a first phase rotation associated with the first transmission that is reciprocal to a second phase rotation associated with a second transmission from the second network node to the first network node. The second transmission may be subjected to the second phase rotation. In one configuration, whether the first network node is authentic may be identified based on a first distribution-based hypothesis test or a first Hamming distance-based similarity test. The second network node may be authenticable based on a second distribution-based hypothesis test or a second Hamming distance-based similarity test.

The means may be the component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
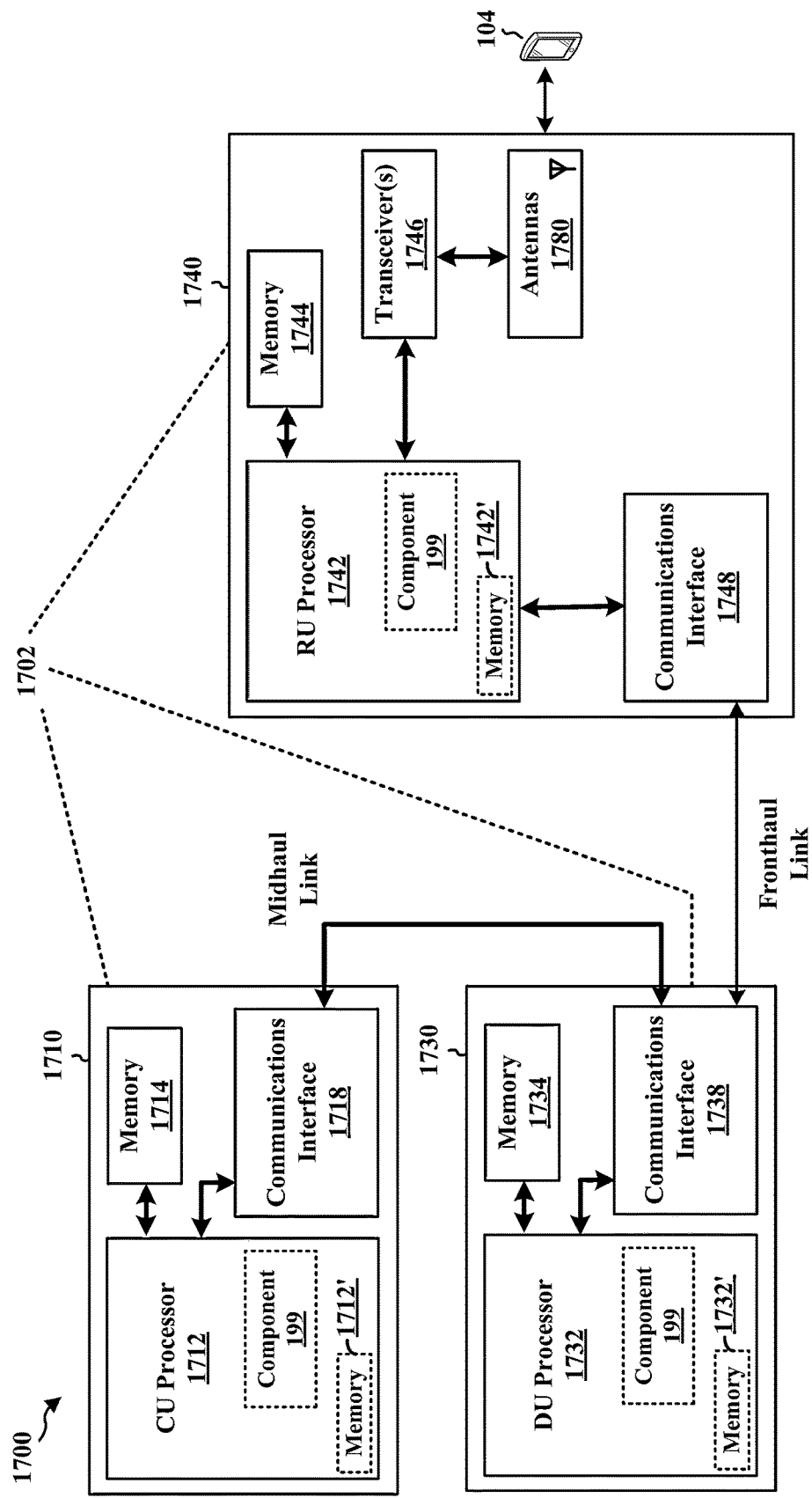
FIG. 17 is a diagram illustrating an example of a hardware implementation for an example network entity, in accordance with various aspects of the present disclosure.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748, all or any portion of which may implement any number of MIMO paths. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit one or more authentication proofs to a second network node. The one or more authentication proofs may be based on one or more credentials associated with the first network node. The first network node may be authenticable based on the one or more authentication proofs. The component 199 may be configured to receive one or more configuration requests from the second network node. The one or more configuration requests may include one or more phase-modulated indications of one or more second credentials associated with the second network node. The one or more configuration requests may be based on one or more random phases. The component 199 may be configured to transmit one or more configuration responses to the second network node. The one or more configuration responses may include one or more phase-modulated confidential parameters. The one or more configuration responses may be based on the one or more configuration requests. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 includes means for transmitting one or more authentication proofs to a second network node. The one or more authentication proofs may be based on one or more credentials associated with the first network node. The first network node may be authenticable based on the one or more authentication proofs. The network entity 1702 includes means for receiving one or more configuration requests from the second network node. The one or more configuration requests may include one or more phase-modulated indications of one or more second credentials associated with the second network node. The one or more configuration requests may be based on one or more random phases. The network entity 1702 includes means for transmitting one or more configuration responses to the second network node. The one or more configuration responses may include one or more phase-modulated confidential parameters. The one or more configuration responses may be based on the one or more configuration requests.

In one configuration, the network entity 1702 includes means for transmitting one or more authentication requests to the second network node. The one or more authentication request may include the one or more random phases. The network entity 1702 includes means for identifying whether the second network node is authentic based on the one or more configuration requests. The one or more configuration responses may be transmitted to the second network node if the second network node is identified as being authentic. In one configuration, the one or more authentication requests may be associated with a randomly selected beam. In one configuration, whether the second network node is authentic may be identified based on a distribution-based hypothesis test or a Hamming distance-based similarity test. In one configuration, the one or more authentication proofs may be transmitted to the second network node prior to the one or more configuration requests being received from the second network node. The one or more configuration requests may be received from the second network node based on the first network node being authenticated based on the one or more authentication proofs. In one configuration, the one or more authentication proofs may be further based on one or more time indexes and one or more uninvertible one-way functions. In one configuration, the one or more authentication requests and the one or more authentication proofs may be transmitted simultaneously and via different subcarriers. In one configuration, the one or more authentication requests and the one or more authentication proofs may be transmitted via adjacent time-frequency resources. The one or more authentication proofs may be further based on the one or more random phases and one or more one-way hash functions. In one configuration, the one or more authentication proofs may be transmitted to the second network node after the one or more configuration requests are received from the second network node. In one configuration, the one or more authentication proofs may be further based on the one or more configuration requests. In one configuration, the one or more authentication proofs may be associated with a plurality of tones. In one configuration, the one or more configuration requests and the one or more configuration responses may be each associated with a plurality of tones. In one configuration, a first transmission from the first network node to the second network node may be subjected to a first phase rotation associated with the first transmission that is reciprocal to a second phase rotation associated with a second transmission from the second network node to the first network node. The second transmission may be subjected to the second phase rotation. In one configuration, the first network node may be authenticable based on a distribution-based hypothesis test or a Hamming distance-based similarity test.

The means may be the component 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

The following aspects are illustrative only and may be combined with other aspects or teachings described herein, without limitation.

Aspect 1: A method for mutual authentication in wireless communication, the method comprising: transmitting a first authentication request from a first network node to a second network node via a first multiple-input and multiple-output (MIMO) path between the first network node and the second network node, the first authentication request comprising a first phase; transmitting a second authentication request from the first network node to the second network node via a second MIMO path between the first network node and the second network node, the second authentication request comprising a second phase; transmitting an authentication proof from the first network node to the second network node; receiving, at the first network node from the second network node via the first MIMO path, a first configuration request corresponding to a first configuration request credential associated with the second network node, wherein the first configuration request credential is based at least in part on the first phase and an authentication of the authentication proof; receiving, at the first network node from the second network node via the second MIMO path, a second configuration request corresponding to a second configuration request credential associated with the second network node, wherein the second configuration request credential is based at least in part on the second phase and the authentication of the authentication proof; transmitting, based at least in part on authenticating the first configuration request credential, a first configuration response in response to the first configuration request; and transmitting, based at least in part on authenticating the second configuration request credential, a second configuration response in response to the second configuration request.

Aspect 2: The method of aspect 1, wherein the authentication proof comprises a first authentication request credential corresponding to the first MIMO path, and a second authentication request credential corresponding to the second MIMO path.

Aspect 3: The method of aspects 1 or 2, wherein the authentication proof is configured to be authenticated by the second network node based on a relative difference between the first phase and the second phase.

Aspect 4: The method of any of aspects 1 to 3, wherein the authentication proof comprises a first authentication proof portion corresponding to the first MIMO path and a second authentication proof portion corresponding to the second MIMO path.

Aspect 5: The method of any of aspects 1 to 4, wherein the authentication proof is transmitted before receiving the first configuration request and the second configuration request.

Aspect 6: The method of any of aspects 1 to 5, wherein receiving the first configuration request and the second configuration request is based at least in part on the first network node being authenticated based on the authentication proof.

Aspect 7: The method of any of aspects 1 to 6, wherein the authentication proof is transmitted after receiving the first configuration request and the second configuration request.

Aspect 8: The method of any of aspects 1 to 7, wherein the authentication proof is based at least in part on the first configuration request and the second configuration request.

Aspect 9: The method of any of aspects 1 to 8, wherein: the first configuration request comprises a first phase-modulated indication of the first configuration request credential associated with the second network node; and the second configuration request comprises a second phase-modulated indication of the second configuration request credential associated with the second network node.

Aspect 10: The method of any of aspects 1 to 9, wherein: the first configuration response comprises a first configuration parameter; and the second configuration response comprises a second configuration parameter.

Aspect 11: The method of any of aspects 1 to 10, wherein: the first phase is a first random phase; and the second phase is a second random phase.

Aspect 12: A method for mutual authentication in wireless communication, the method comprising: receiving, at a second network node from a first network node via a first multiple-input and multiple-output (MIMO) path, a first authentication request comprising a first phase; receiving, at the second network node from the first network node via a second MIMO path, a second authentication request comprising a second phase; receiving an authentication proof at the second network node from the first network node; transmitting, to the first network node from the second network node via the first MIMO path, a first configuration request corresponding to a first configuration request credential associated with the second network node, wherein the first configuration request credential is based at least in part on the first phase and an authentication of the authentication proof; transmitting, to the first network node from the second network node via the second MIMO path, a second configuration request corresponding to a second configuration request credential associated with the second network node, wherein the second configuration request credential is based at least in part on the second phase and the authentication of the authentication proof; receiving, based at least in part on authentication of the first configuration request credential, a first configuration response in response to the first configuration request; and receiving, based at least in part on authentication of the second configuration request credential, a second configuration response in response to the second configuration request.

Aspect 13: The method of aspect 12, wherein the authentication proof comprises a first authentication request credential corresponding to the first MIMO path, and a second authentication request credential corresponding to the second MIMO path.

Aspect 14: The method of aspects 12 or 13, wherein the authentication proof is configured to be authenticated by the second network node based on a relative difference between the first phase and the second phase.

Aspect 15: The method of any of aspects 12 to 14, wherein the authentication proof comprises a first authentication proof portion corresponding to the first MIMO path and a second authentication proof portion corresponding to the second MIMO path.

Aspect 16: The method of any of aspects 12-15, wherein the authentication proof is transmitted before receiving the first configuration request and the second configuration request.

Aspect 17: The method of any of aspects 12-16, wherein receiving the first configuration request and the second configuration request is based at least in part on the first network node being authenticated based on the authentication proof.

Aspect 18: The method of any of aspects 12-17, wherein the authentication proof is transmitted after receiving the first configuration request and the second configuration request.

Aspect 19: The method of any of aspects 12-18, wherein the authentication proof is based at least in part on the first configuration request and the second configuration request.

Aspect 20: The method of any of aspects 12-19, wherein: the first configuration request comprises a first phase-modulated indication of the first configuration request credential associated with the second network node; and the second configuration request comprises a second phase-modulated indication of the second configuration request credential associated with the second network node.

Aspect 21: The method of any of aspects 12-20, wherein: the first configuration response comprises a first configuration parameter; and the second configuration response comprises a second configuration parameter.

Aspect 22: The method of any of aspects 12-21, wherein: the first phase is a first random phase; and the second phase is a second random phase.

Aspect 23: An apparatus for mutual authentication in wireless communication, the apparatus comprising: at least one memory; and at least one processor coupled to the at least one memory and configured to: transmit a first authentication request from a first network node to a second network node via a first multiple-input and multiple-output (MIMO) path between the first network node and the second network node, the first authentication request comprising a first phase; transmit a second authentication request from the first network node to the second network node via a second MIMO path between the first network node and the second network node, the second authentication request comprising a second phase; transmit an authentication proof from the first network node to the second network node; receive, at the first network node from the second network node via the first MIMO path, a first configuration request corresponding to a first configuration request credential associated with the second network node, wherein the first configuration request credential is based at least in part on the first phase and an authentication of the authentication proof; receive, at the first network node from the second network node via the second MIMO path, a second configuration request corresponding to a second configuration request credential associated with the second network node, wherein the second configuration request credential is based at least in part on the second phase and the authentication of the authentication proof; transmit, based at least in part on authenticating the first configuration request credential, a first configuration response in response to the first configuration request; and transmit, based at least in part on authenticating the second configuration request credential, a second configuration response in response to the second configuration request.

Aspect 24: The apparatus of aspect 23, wherein the authentication proof comprises a first authentication request credential corresponding to the first MIMO path, and a second authentication request credential corresponding to the second MIMO path.

Aspect 25: The apparatus of aspect 23 or 24, wherein the authentication proof is configured to be authenticated by the second network node based on a relative difference between the first phase and the second phase.

Aspect 26: The apparatus of any of aspects 23 to 25, wherein the authentication proof comprises a first authentication proof portion corresponding to the first MIMO path and a second authentication proof portion corresponding to the second MIMO path.

Aspect 27: The apparatus of any of aspects 23 to 26, wherein the authentication proof is transmitted before receiving the first configuration request and the second configuration request.

Aspect 28: The apparatus of any of aspects 23 to 27, wherein receiving the first configuration request and the second configuration request is based at least in part on the first network node being authenticated based on the authentication proof.

Aspect 29: The apparatus of any of aspects 23 to 28, wherein the authentication proof is transmitted after receiving the first configuration request and the second configuration request.

Aspect 30: The apparatus of any of aspects 23 to 29, wherein the authentication proof is based at least in part on the first configuration request and the second configuration request.

Aspect 31: The apparatus of any of aspects 23 to 30, wherein: the first configuration request comprises a first phase-modulated indication of the first configuration request credential associated with the second network node; and the second configuration request comprises a second phase-modulated indication of the second configuration request credential associated with the second network node.

Aspect 32: The apparatus of any of aspects 23 to 31, wherein: the first configuration response comprises a first configuration parameter; and the second configuration response comprises a second configuration parameter.

Aspect 33: The apparatus of any of aspects 23 to 32, wherein: the first phase is a first random phase; and the second phase is a second random phase.

Aspect 34: An apparatus method for mutual authentication in wireless communication, the apparatus comprising: at least one memory; and at least one processor coupled to the at least one memory and configured to: receive, at a second network node from a first network node via a first multiple-input and multiple-output (MIMO) path, a first authentication request comprising a first phase; receive, at the second network node from the first network node via a second MIMO path, a second authentication request comprising a second phase; receive an authentication proof at the second network node from the first network node; transmit, to the first network node from the second network node via the first MIMO path, a first configuration request corresponding to a first configuration request credential associated with the second network node, wherein the first configuration request credential is based at least in part on the first phase and an authentication of the authentication proof; transmit, to the first network node from the second network node via the second MIMO path, a second configuration request corresponding to a second configuration request credential associated with the second network node, wherein the second configuration request credential is based at least in part on the second phase and the authentication of the authentication proof; receive, based at least in part on authentication of the first configuration request credential, a first configuration response in response to the first configuration request; and receive, based at least in part on authentication of the second configuration request credential, a second configuration response in response to the second configuration request.

Aspect 35: The apparatus of aspect 34, wherein the authentication proof comprises a first authentication request credential corresponding to the first MIMO path, and a second authentication request credential corresponding to the second MIMO path.

Aspect 36: The apparatus of aspect 34 or 35, wherein the authentication proof is configured to be authenticated by the second network node based on a relative difference between the first phase and the second phase.

Aspect 37: The apparatus of any of aspects 34 to 36, wherein the authentication proof comprises a first authentication proof portion corresponding to the first MIMO path and a second authentication proof portion corresponding to the second MIMO path.

Aspect 38: The apparatus of any of aspects 34 to 37, wherein the authentication proof is transmitted before receiving the first configuration request and the second configuration request.

Aspect 39: The apparatus of any of aspects 34 to 38, wherein receiving the first configuration request and the second configuration request is based at least in part on the first network node being authenticated based on the authentication proof.

Aspect 40: The apparatus of any of aspects 34 to 39, wherein the authentication proof is transmitted after receiving the first configuration request and the second configuration request.

Aspect 41: The apparatus of any of aspects 34 to 40, wherein the authentication proof is based at least in part on the first configuration request and the second configuration request.

Aspect 42: The apparatus of any of aspects 34 to 41, wherein: the first configuration request comprises a first phase-modulated indication of the first configuration request credential associated with the second network node; and the second configuration request comprises a second phase-modulated indication of the second configuration request credential associated with the second network node.

Aspect 43: The apparatus of any of aspects 34 to 42, wherein: the first configuration response comprises a first configuration parameter; and the second configuration response comprises a second configuration parameter.

Aspect 44: The apparatus of any of aspects 34 to 43, wherein: the first phase is a first random phase; and the second phase is a second random phase.

What is claimed is:

1. A method for mutual authentication in wireless communication, the method comprising:
   transmitting a first authentication request from a first network node to a second network node via a first multiple-input and multiple-output (MIMO) path between the first network node and the second network node, the first authentication request comprising a first phase;
   transmitting a second authentication request from the first network node to the second network node via a second MIMO path between the first network node and the second network node, the second authentication request comprising a second phase;
   transmitting an authentication proof from the first network node to the second network node;
   receiving, at the first network node from the second network node via the first MIMO path, a first configuration request corresponding to a first configuration request credential associated with the second network node, wherein the first configuration request credential is based at least in part on the first phase and an authentication of the authentication proof;
   receiving, at the first network node from the second network node via the second MIMO path, a second configuration request corresponding to a second configuration request credential associated with the second network node, wherein the second configuration request credential is based at least in part on the second phase and the authentication of the authentication proof;
   transmitting, based at least in part on authenticating the first configuration request credential, a first configuration response in response to the first configuration request; and
   transmitting, based at least in part on authenticating the second configuration request credential, a second configuration response in response to the second configuration request.

2. The method of claim 1, wherein the authentication proof comprises a first authentication request credential corresponding to the first MIMO path, and a second authentication request credential corresponding to the second MIMO path.

3. The method of claim 2, wherein the authentication proof is configured to be authenticated by the second network node based on a relative difference between the first phase and the second phase.

4. The method of claim 1, wherein the authentication proof comprises a first authentication proof portion corresponding to the first MIMO path and a second authentication proof portion corresponding to the second MIMO path.

5. The method of claim 1, wherein the authentication proof is transmitted before receiving the first configuration request and the second configuration request.

6. The method of claim 5, wherein receiving the first configuration request and the second configuration request is based at least in part on the first network node being authenticated based on the authentication proof.

7. The method of claim 1, wherein the authentication proof is transmitted after receiving the first configuration request and the second configuration request.

8. The method of claim 7, wherein the authentication proof is based at least in part on the first configuration request and the second configuration request.

9. The method of claim 1, wherein:
   the first configuration request comprises a first phase-modulated indication of the first configuration request credential associated with the second network node; and the second configuration request comprises a second phase-modulated indication of the second configuration request credential associated with the second network node.

10. The method of claim 1, wherein:
the first configuration response comprises a first configuration parameter; and
the second configuration response comprises a second configuration parameter.

11. The method of claim 1, wherein:
the first phase is a first random phase; and
the second phase is a second random phase.

12. A method for mutual authentication in wireless communication, the method comprising:
receiving, at a second network node from a first network node via a first multiple-input and multiple-output (MIMO) path, a first authentication request comprising a first phase;
receiving, at the second network node from the first network node via a second MIMO path, a second authentication request comprising a second phase;
receiving an authentication proof at the second network node from the first network node;
transmitting, to the first network node from the second network node via the first MIMO path, a first configuration request corresponding to a first configuration request credential associated with the second network node, wherein the first configuration request credential is based at least in part on the first phase and an authentication of the authentication proof;
transmitting, to the first network node from the second network node via the second MIMO path, a second configuration request corresponding to a second configuration request credential associated with the second network node, wherein the second configuration request credential is based at least in part on the second phase and the authentication of the authentication proof;
receiving, based at least in part on authentication of the first configuration request credential, a first configuration response in response to the first configuration request; and
receiving, based at least in part on authentication of the second configuration request credential, a second configuration response in response to the second configuration request.

13. The method of claim 12, wherein the authentication proof comprises a first authentication request credential corresponding to the first MIMO path, and a second authentication request credential corresponding to the second MIMO path.

14. The method of claim 13, wherein the authentication proof is configured to be authenticated by the second network node based on a relative difference between the first phase and the second phase.

15. The method of claim 12, wherein the authentication proof comprises a first authentication proof portion corresponding to the first MIMO path and a second authentication proof portion corresponding to the second MIMO path.

16. The method of claim 12, wherein the authentication proof is transmitted before receiving the first configuration request and the second configuration request.

17. The method of claim 16, wherein receiving the first configuration request and the second configuration request is based at least in part on the first network node being authenticated based on the authentication proof.

18. The method of claim 12, wherein the authentication proof is transmitted after receiving the first configuration request and the second configuration request.

19. The method of claim 18, wherein the authentication proof is based at least in part on the first configuration request and the second configuration request.

20. The method of claim 12, wherein:
the first configuration request comprises a first phase-modulated indication of the first configuration request credential associated with the second network node; and
the second configuration request comprises a second phase-modulated indication of the second configuration request credential associated with the second network node.

21. The method of claim 12, wherein:
the first configuration response comprises a first configuration parameter; and
the second configuration response comprises a second configuration parameter.

22. The method of claim 12, wherein:
the first phase is a first random phase; and
the second phase is a second random phase.

23. An apparatus for mutual authentication in wireless communication, the apparatus comprising:
at least one memory; and
at least one processor coupled to the at least one memory and configured to:
transmit a first authentication request from a first network node to a second network node via a first multiple-input and multiple-output (MIMO) path between the first network node and the second network node, the first authentication request comprising a first phase;
transmit a second authentication request from the first network node to the second network node via a second MIMO path between the first network node and the second network node, the second authentication request comprising a second phase;
transmit an authentication proof from the first network node to the second network node;
receive, at the first network node from the second network node via the first MIMO path, a first configuration request corresponding to a first configuration request credential associated with the second network node, wherein the first configuration request credential is based at least in part on the first phase and an authentication of the authentication proof;
receive, at the first network node from the second network node via the second MIMO path, a second configuration request corresponding to a second configuration request credential associated with the second network node, wherein the second configuration request credential is based at least in part on the second phase and the authentication of the authentication proof;
transmit, based at least in part on authenticating the first configuration request credential, a first configuration response in response to the first configuration request; and
transmit, based at least in part on authenticating the second configuration request credential, a second configuration response in response to the second configuration request.

24. The apparatus of claim 23, wherein the authentication proof comprises a first authentication request credential corresponding to the first MIMO path, and a second authentication request credential corresponding to the second MIMO path.

25. The apparatus of claim 24, wherein the authentication proof is configured to be authenticated by the second network node based on a relative difference between the first phase and the second phase.

26. The apparatus of claim 23, wherein the authentication proof comprises a first authentication proof portion corresponding to the first MIMO path and a second authentication proof portion corresponding to the second MIMO path.

27. The apparatus of claim 23, wherein the authentication proof is transmitted before receiving the first configuration request and the second configuration request.

28. The apparatus of claim 27, wherein receiving the first configuration request and the second configuration request is based at least in part on the first network node being authenticated based on the authentication proof.

29. The apparatus of claim 27, wherein the authentication proof is transmitted after receiving the first configuration request and the second configuration request.

30. The apparatus of claim 29, wherein the authentication proof is based at least in part on the first configuration request and the second configuration request.

31. The apparatus of claim 23, wherein:
the first configuration request comprises a first phase-modulated indication of the first configuration request credential associated with the second network node; and
the second configuration request comprises a second phase-modulated indication of the second configuration request credential associated with the second network node.

32. The apparatus of claim 23, wherein:
the first configuration response comprises a first configuration parameter; and
the second configuration response comprises a second configuration parameter.

33. The apparatus of claim 23, wherein:
the first phase is a first random phase; and
the second phase is a second random phase.

34. An apparatus for mutual authentication in wireless communication, the apparatus comprising:
at least one memory; and
at least one processor coupled to the at least one memory and configured to:
receive, at a second network node from a first network node via a first multiple-input and multiple-output (MIMO) path, a first authentication request comprising a first phase;
receive, at the second network node from the first network node via a second MIMO path, a second authentication request comprising a second phase;
receive an authentication proof at the second network node from the first network node;
transmit, to the first network node from the second network node via the first MIMO path, a first configuration request corresponding to a first configuration request credential associated with the second network node, wherein the first configuration request credential is based at least in part on the first phase and an authentication of the authentication proof;
transmit, to the first network node from the second network node via the second MIMO path, a second configuration request corresponding to a second configuration request credential associated with the second network node, wherein the second configuration request credential is based at least in part on the second phase and the authentication of the authentication proof;
receive, based at least in part on authentication of the first configuration request credential, a first configuration response in response to the first configuration request; and
receive, based at least in part on authentication of the second configuration request credential, a second configuration response in response to the second configuration request.

35. The apparatus of claim 34, wherein the authentication proof comprises a first authentication request credential corresponding to the first MIMO path, and a second authentication request credential corresponding to the second MIMO path.

36. The apparatus of claim 35, wherein the authentication proof is configured to be authenticated by the second network node based on a relative difference between the first phase and the second phase.

37. The apparatus of claim 34, wherein the authentication proof comprises a first authentication proof portion corresponding to the first MIMO path and a second authentication proof portion corresponding to the second MIMO path.

38. The apparatus of claim 34, wherein the authentication proof is transmitted before receiving the first configuration request and the second configuration request.

39. The apparatus of claim 38, wherein receiving the first configuration request and the second configuration request is based at least in part on the first network node being authenticated based on the authentication proof.

40. The apparatus of claim 34, wherein the authentication proof is transmitted after receiving the first configuration request and the second configuration request.

41. The apparatus of claim 40, wherein the authentication proof is based at least in part on the first configuration request and the second configuration request.

42. The apparatus of claim 34, wherein:
the first configuration request comprises a first phase-modulated indication of the first configuration request credential associated with the second network node; and
the second configuration request comprises a second phase-modulated indication of the second configuration request credential associated with the second network node.

43. The apparatus of claim 34, wherein:
the first configuration response comprises a first configuration parameter; and
the second configuration response comprises a second configuration parameter.

44. The apparatus of claim 34, wherein:
the first phase is a first random phase; and
the second phase is a second random phase.

* * * * *